United States Patent
Wu et al.

(10) Patent No.: US 11,252,098 B2
(45) Date of Patent: *Feb. 15, 2022

(54) DATA TRANSMISSION METHOD, TRANSMITTER, AND RECEIVER

(71) Applicant: Huawei Technologies Co., Ltd., Shenzhen (CN)

(72) Inventors: Qiuyou Wu, Dongguan (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,646

(22) Filed: Jan. 22, 2020

(65) Prior Publication Data
US 2020/0236058 A1    Jul. 23, 2020

Related U.S. Application Data

(63) Continuation of application No. 15/883,819, filed on Jan. 30, 2018, now Pat. No. 10,623,327, which is a (Continued)

(30) Foreign Application Priority Data

Jul. 30, 2015 (CN) .......................... 201510456499.1

(51) Int. Cl.
*H04L 12/811* (2013.01)
*H04L 1/00* (2006.01)
(Continued)

(52) U.S. Cl.
CPC ................ *H04L 47/38* (2013.01); *H04L 1/00* (2013.01); *H04L 1/004* (2013.01); *H04L 1/0008* (2013.01);
(Continued)

(58) Field of Classification Search
CPC ......... H04L 47/38; H04L 1/00; H04L 1/0008; H04L 1/0025; H04L 1/004; H04L 45/66;
(Continued)

(56) References Cited

U.S. PATENT DOCUMENTS 8,243,656 B1 *  8/2012  Bhan .................... H04W 76/11
                                                  370/328
2004/0156390 A1  8/2004  Prasad et al.
(Continued)

FOREIGN PATENT DOCUMENTS

CN    102196321 A    9/2011
CN    102281477 A    12/2011
(Continued)

OTHER PUBLICATIONS

Machine Translation and Abstract of Chinese Publication No. CN102196321, Sep. 21, 2011, 21 pages.
(Continued)

*Primary Examiner* — Kiet Tang
(74) *Attorney, Agent, or Firm* — Conley Rose, P.C.

(57) ABSTRACT

A data transmission method, a transmitter, and a receiver, where the method includes obtaining constant bit rate (CBR) service data, performing physical coding sublayer (PCS) encoding on the CBR service data, inserting a rate adaptation code block in a PCS bitstream obtained by PCS encoding to perform rate adaptation on the PCS bitstream, mapping the adapted PCS bitstream to N timeslots of a flexible Ethernet (FlexE) frame, where N is a positive integer greater than or equal to one, and sending the FlexE frame, where FlexE overhead of the FlexE frame includes information indicating the N timeslots corresponding to the PCS bitstream. Hence, according to the data transmission method,
(Continued)

the transmitter, and the receiver, the CBR service data may be mapped to a FlexE, and a carrying capability of the FlexE is improved.

20 Claims, 10 Drawing Sheets

Related U.S. Application Data continuation of application No. PCT/CN2016/088887, filed on Jul. 6, 2016.

(51) Int. Cl.
*H04L 12/721* (2013.01)
*H04L 12/851* (2013.01)
*H04L 12/825* (2013.01)

(52) U.S. Cl.
CPC ............ *H04L 1/0025* (2013.01); *H04L 45/66* (2013.01); *H04L 47/24* (2013.01); *H04L 47/25* (2013.01); *H04L 1/0057* (2013.01)

(58) Field of Classification Search
CPC ....... H04L 47/24; H04L 47/25; H04L 1/0057; H04L 1/0002; H04L 1/0056; H04J 2203/0085; H04J 3/07; H04J 3/1658
See application file for complete search history.

(56) References Cited

U.S. PATENT DOCUMENTS

| | | | |
|---|---|---|---|
| 2008/0144505 A1* | 6/2008 | Isnardi | H04N 21/2402 370/235 |
| 2010/0098415 A1 | 4/2010 | Jiang | |
| 2010/0198980 A1 | 8/2010 | Astrom et al. | |
| 2012/0219291 A1* | 8/2012 | Chiku | H04J 3/1652 398/46 |
| 2016/0191277 A1 | 6/2016 | Li et al. | |
| 2016/0294990 A1* | 10/2016 | Cao | H04L 1/0083 |
| 2017/0005742 A1* | 1/2017 | Gareau | H04J 3/1658 |

FOREIGN PATENT DOCUMENTS

| | | |
|---|---|---|
| CN | 104426631 A | 3/2015 |
| EP | 1798917 A1 | 6/2007 |
| JP | 2012517130 A | 7/2012 |

OTHER PUBLICATIONS

Machine Translation and Abstract of Chinese Publication No. CN102281477, Dec. 14, 2011, 14 pages.
"Series G: Transmission Systems and Media, Digital Systems and Networks, Digital terminal equipments—General, Series Y: Global Information Infrastructure, Internet Protocol Aspects and Next-Generation Networks, Internet protocol aspects—Transport, Interfaces for optical transport network," ITU-T G.709/Y.1331, Feb. 2012, 238 pages.
Trowbridge, S., "Ethernet and OTN—400G and beyond," OFC, OSA, Mar. 26, 2015, 18 pages.
Exar, "Recent Features of OTN (G.709)," May 2011, 8 pages.
Yong, L., "The mapping and multiplexing of client signals and analysis of justification ratio in OTN," Study On Optical Communications, 2004, No. 3, 4 pages.
Foreign Communication From A Counterpart Application, PCT Application No. PCT/CN2016/088887, English Translation of International Search Report dated Aug. 31, 2016, 2 pages.
Foreign Communication From A Counterpart Application, PCT Application No. PCT/CN2016/088887, English Translation of Written Opinion dated Aug. 31, 2016, 7 pages.
Foreign Communication From A Counterpart Application, European Application No. 16829745.5, Extended European Search Report dated May 30, 2018, 7 pages.
Foreign Communication From A Counterpart Application, Japanese Application No. 2018-504775, Japanese Notice of Allowance dated Jan. 29, 2019, 3 pages.
Foreign Communication From A Counterpart Application, Chinese Application No. 201510456499.1, Chinese Office Action dated Mar. 1, 2019, 3 pages.
Foreign Communication From A Counterpart Application, Chinese Application No. 201510456499.1, Chinese Search Report dated Feb. 19, 2019, 2 pages.

\* cited by examiner

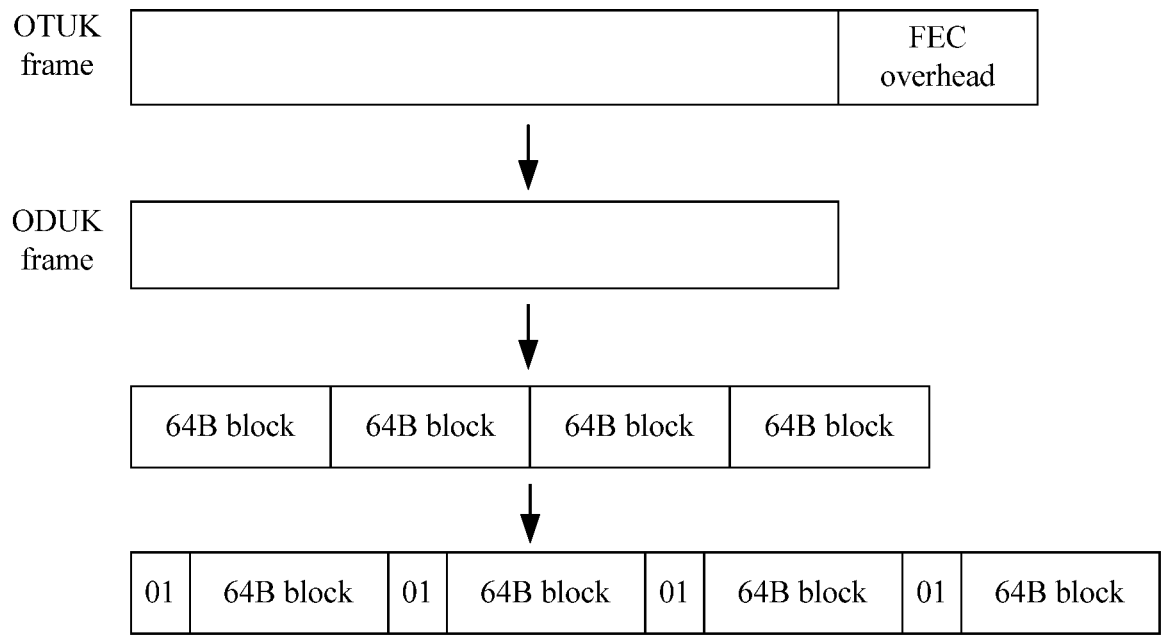

| 10 | 0x4B | D1 | D2 | D3 | 0x5 | 0x000_0000 |

400

```
Receive a FlexE frame, where the FlexE frame includes a PCS bitstream      S410
corresponding to CBR service data, and FlexE overhead of the FlexE
frame includes information used to indicate N timeslots of the FlexE
frame that correspond to the PCS bitstream
```

```
Obtain, from the N timeslots of the FlexE frame by means of parsing,       S420
the PCS bitstream including a rate adaptation code block according to
the information used to indicate the N timeslots of the FlexE frame that
correspond to the PCS bitstream
```

```
Perform PCS decoding on the PCS bitstream to obtain an                     S430
intermediate frame
```

```
Obtain the mapped CBR service data from the intermediate frame             S440
```

FIG. 12

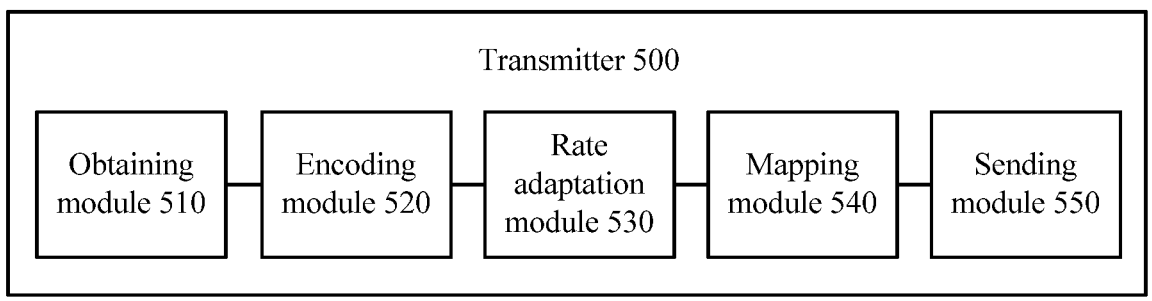

FIG. 13

DATA TRANSMISSION METHOD, TRANSMITTER, AND RECEIVER

CROSS-REFERENCE TO RELATED APPLICATIONS

This application is a continuation of U.S. patent application Ser. No. 15/883,819, filed on Jan. 30, 2018, which is a continuation of International Patent Application No. PCT/CN2016/088887, filed on Jul. 6, 2016, which claims priority to Chinese Patent Application No. 201510456499.1, filed on Jul. 30, 2015. The disclosures of the aforementioned applications are hereby incorporated by reference in their entireties.

TECHNICAL FIELD

Embodiments of the present disclosure relate to the communications field, and in particular, to a data transmission method, a transmitter, and a receiver.

BACKGROUND

The 802.3 based Ethernet defined by the Institute of Electrical and Electronics Engineers (IEEE) has been used as a service interface in various scenarios. An Ethernet rate gradually increases with rapid development of communications technologies such that the 10 megabits per second (Mbit/s) Ethernet, the Fast Ethernet (FE), and the 1 gigabit Ethernet (GE) gradually evolve to the current 100 GE and the 400 GE to be defined by the IEEE. Rapid popularization of the Ethernet propels evolution of the Ethernet from a pure interface technology to a network technology similar to a transport network.

Currently, the Optical Internetworking Forum (OIF) is discussing expansion of a conventional Ethernet application scenario in order to support functions such as a subrate, channelization, and inverse multiplexing for an Ethernet service. Such an Ethernet technology is referred to as a Flexible Ethernet (FlexE). For example, in a subrate application scenario of an Ethernet service, a 250 gigabits per second (Gbit/s) Ethernet service (Media Access Control (MAC) bitstream) can be transmitted using three existing 100GE Physical Medium Dependent (PMD) sublayers. In an inverse multiplexing application scenario of an Ethernet service, a 200 Gbit/s Ethernet service can be transmitted using two existing 100 GE PMDs. In a channelization application scenario of an Ethernet service, similar to a multiplexing function of an optical transport network (OTN), multiple low-rate Ethernet services can be multiplexed to a high-rate FlexE.

As a mainstream transport network technology, the OTN technology can implement flexible scheduling and management of a large-capacity service by virtue of abundant Operation, Administration and Maintenance (OAM), a high Tandem Connection Monitoring (TCM) capability, and an out-of-band Forward Error Correction (FEC) capability. An OTN interface is widely used in an existing network. In addition, technologies such as a Synchronous Digital Hierarchy (SDH) interface and a Constant bit rate (CBR) interface in another form widely exist in the existing network.

In the other approaches, a FlexE shim layer is defined in the FlexE such that a service layer of multiple Ethernet services aggregates traffic of a client layer. However, the foregoing method needs to be based on a MAC frame of the Ethernet, and an idle code block defined in the Ethernet needs to be deleted to perform rate adaptation. Neither a MAC frame nor an idle frame is defined in a CBR service, such as an OTN service or an SDH service. Therefore, mapping to the FlexE cannot be implemented, and rate adaptation cannot be performed.

SUMMARY

Embodiments of the present disclosure provide a data transmission method, a transmitter, and a receiver such that CBR service data may be mapped to a FlexE, and a carrying capability of the FlexE is improved.

According to a first aspect, a data transmission method is provided, including obtaining CBR service data, performing physical coding sublayer (PCS) encoding on the CBR service data, inserting a rate adaptation code block in a PCS bitstream obtained by means of PCS encoding, to perform rate adaptation on the PCS bitstream, mapping the adapted PCS bitstream to N timeslots of a FlexE frame, where N is a positive integer greater than or equal to 1, and sending the FlexE frame, where FlexE overhead of the FlexE frame includes information used to indicate the N timeslots corresponding to the PCS bitstream.

With reference to the first aspect, in an implementation of the first aspect, inserting a rate adaptation code block in a PCS bitstream obtained by means of PCS encoding to perform rate adaptation on the PCS bitstream includes inserting the rate adaptation code block in the PCS bitstream according to a rate of the PCS bitstream and a total rate of the N timeslots of the FlexE frame that are used to transmit the PCS bitstream such that the PCS bitstream in which the rate adaptation code block is inserted can be mapped to the N timeslots of the FlexE frame that are used to transmit the PCS bitstream.

With reference to either the first aspect or the foregoing corresponding implementation, in another implementation of the first aspect, the FlexE overhead further includes information indicating a ratio of a rate of the CBR service data to the total rate of the N timeslots of the FlexE frame that are used to transmit the PCS bitstream.

With reference to any one of the first aspect or the foregoing corresponding implementations, in another implementation of the first aspect, the FlexE overhead further includes information indicating a quantity of bit blocks of the CBR service data in a specific FlexE frame period and/or information indicating a quantity of bits of the CBR service data in a specific FlexE frame period.

With reference to any one of the first aspect or the foregoing corresponding implementations, in another implementation of the first aspect, obtaining CBR service data includes receiving a CBR service data frame, where the data frame includes FEC overhead, performing error correction on the data frame according to the FEC overhead, and terminating the FEC overhead in the corrected data frame, to obtain the CBR service data.

With reference to any one of the first aspect or the foregoing corresponding implementations, in another implementation of the first aspect, the rate adaptation code block is an idle code block.

With reference to any one of the first aspect or the foregoing corresponding implementations, in another implementation of the first aspect, the FlexE overhead further includes information indicating a sequence of a physical layer (PHY) device and/or information indicating a type of the CBR service data.

With reference to any one of the first aspect or the foregoing corresponding implementations, in another implementation of the first aspect, performing PCS encoding on the CBR service data includes performing 64B/66B encoding, 256B/257B encoding, or 512B/513B encoding on the CBR service data to obtain the PCS bitstream, where XB/YB encoding indicates converting X-bit data to Y-bit line code.

With reference to any one of the first aspect or the foregoing corresponding implementations, in another implementation of the first aspect, the CBR service data is OTN service data or SDH service data.

According to a second aspect, a data transmission method is provided, including obtaining CBR service data, mapping the CBR service data to an intermediate frame, where a rate of a PCS bitstream obtained by performing PCS encoding on the intermediate frame is equal to a total rate of N timeslots of a FlexE frame, performing PCS encoding on the intermediate frame, mapping the PCS bitstream obtained by means of PCS encoding to the N timeslots of the FlexE frame, and sending the FlexE frame, where FlexE overhead of the FlexE frame includes information used to indicate the N timeslots corresponding to the PCS bitstream.

With reference to the second aspect, in an implementation of the second aspect, mapping the CBR service data to an intermediate frame includes mapping the CBR service data to the intermediate frame using an asynchronous mapping procedure (AMP) or a generic mapping procedure (GMP), and adding overhead of the AMP or overhead of the GMP to the intermediate frame.

With reference to either the second aspect or the foregoing corresponding implementation, in another implementation of the second aspect, the FlexE overhead further includes information indicating a sequence of a PHY device and/or information indicating a type of the CBR service data.

With reference to any one of the second aspect or the foregoing corresponding implementations, in another implementation of the second aspect, the performing PCS encoding on the intermediate frame includes performing 64B/66B encoding, 256B/257B encoding, or 512B/513B encoding on the intermediate frame to obtain the PCS bitstream.

With reference to any one of the second aspect or the foregoing corresponding implementations, in another implementation of the second aspect, the CBR service data is OTN service data or SDH service data.

According to a third aspect, a data transmission method is provided, including receiving a FlexE frame, where the FlexE frame includes a PCS bitstream corresponding to CBR service data, and FlexE overhead of the FlexE frame includes information used to indicate N timeslots of the FlexE frame that correspond to the PCS bitstream, obtaining, from the N timeslots of the FlexE frame by means of parsing, the PCS bitstream including a rate adaptation code block according to the information used to indicate the N timeslots of the FlexE frame that correspond to the PCS bitstream, deleting the rate adaptation code block in the PCS bitstream, and performing PCS decoding on the PCS bitstream from which the rate adaptation code block is deleted to obtain the CBR service data.

With reference to the third aspect, in an implementation of the third aspect, a quantity of rate adaptation code blocks included in the PCS bitstream is determined by a transmitter according to a rate of the PCS bitstream and a total rate of the N timeslots of the FlexE frame that are used to transmit the PCS bitstream.

With reference to either the third aspect or the foregoing corresponding implementation, in another implementation of the third aspect, the FlexE overhead further includes information indicating a quantity of bit blocks of the CBR service data in a specific FlexE frame period and/or information indicating a quantity of bits of the CBR service data in a specific FlexE frame period, and deleting the rate adaptation code block in the PCS bitstream includes deleting the rate adaptation code block in the PCS bitstream according to the information about a quantity of bit blocks and/or the information about a quantity of bits.

With reference to any one of the third aspect or the foregoing corresponding implementations, in another implementation of the third aspect, the rate adaptation code block is an IDLE code block.

With reference to any one of the third aspect or the foregoing corresponding implementations, in another implementation of the third aspect, the FlexE overhead further includes information indicating a sequence of a PHY device and/or information indicating a type of the CBR service data.

With reference to any one of the third aspect or the foregoing corresponding implementations, in another implementation of the third aspect, performing PCS decoding on the PCS bitstream from which the rate adaptation code block is deleted to obtain the CBR service data includes performing 64B/66B decoding, 256B/257B decoding, or 512B/513B decoding on the PCS bitstream from which the rate adaptation code block is deleted to obtain the CBR service data.

With reference to any one of the third aspect or the foregoing corresponding implementations, in another implementation of the third aspect, the CBR service data is OTN service data or SDH service data.

According to a fourth aspect, a data transmission method is provided, including receiving a FlexE frame, where the FlexE frame includes a PCS bitstream corresponding to CBR service data, and FlexE overhead of the FlexE frame includes information used to indicate N timeslots of the FlexE frame that correspond to the PCS bitstream, obtaining, from the N timeslots of the FlexE frame by means of parsing, the PCS bitstream including a rate adaptation code block according to the information used to indicate the N timeslots of the FlexE frame that correspond to the PCS bitstream, performing PCS decoding on the PCS bitstream to obtain an intermediate frame, and obtaining the mapped CBR service data from the intermediate frame.

With reference to the fourth aspect, in an implementation of the fourth aspect, the CBR service data is mapped to the intermediate frame using an AMP or a GMP, and the intermediate frame includes overhead of the AMP or overhead of the GMP.

According to a fifth aspect, a transmitter is provided, including an obtaining module configured to obtain CBR service data, an encoding module configured to perform PCS encoding on the CBR service data obtained by the obtaining module, a rate adaptation module configured to insert a rate adaptation code block in a PCS bitstream obtained by the encoding module to perform rate adaptation on the PCS bitstream, a mapping module configured to map the PCS bitstream adapted by the rate adaptation module to N timeslots of a FlexE frame, where N is a positive integer greater than or equal to 1, and a sending module configured to send the FlexE frame, where FlexE overhead of the FlexE frame includes information used to indicate the N timeslots corresponding to the PCS bitstream.

With reference to the fifth aspect, in an implementation of the fifth aspect, the rate adaptation module is further configured to insert the rate adaptation code block in the PCS bitstream according to a rate of the PCS bitstream and a total rate of the N timeslots of the FlexE frame that are used to transmit the PCS bitstream such that the PCS bitstream in which the rate adaptation code block is inserted can be mapped to the N timeslots of the FlexE frame that are used to transmit the PCS bitstream.

With reference to either the fifth aspect or the foregoing corresponding implementation, in another implementation of the fifth aspect, the FlexE overhead further includes information indicating a ratio of a rate of the CBR service data to the total rate of the N timeslots of the FlexE frame that are used to transmit the PCS bitstream.

With reference to any one of the fifth aspect or the foregoing corresponding implementations, in another implementation of the fifth aspect, the FlexE overhead further includes information indicating a quantity of bit blocks of the CBR service data in a specific FlexE frame period and/or information indicating a quantity of bits of the CBR service data in a specific FlexE frame period.

With reference to any one of the fifth aspect or the foregoing corresponding implementations, in another implementation of the fifth aspect, the obtaining module is further configured to receive a CBR service data frame, where the data frame includes FEC overhead, perform error correction on the data frame according to the FEC overhead, and terminate the FEC overhead in the corrected data frame, to obtain the CBR service data.

With reference to any one of the fifth aspect or the foregoing corresponding implementations, in another implementation of the fifth aspect, the rate adaptation code block is an idle code block.

With reference to any one of the fifth aspect or the foregoing corresponding implementations, in another implementation of the fifth aspect, the FlexE overhead further includes information indicating a sequence of a PHY device and/or information indicating a type of the CBR service data.

With reference to any one of the fifth aspect or the foregoing corresponding implementations, in another implementation of the fifth aspect, the encoding module is further configured to perform 64B/66B encoding, 256B/257B encoding, or 512B/513B encoding on the CBR service data, to obtain the PCS bitstream.

With reference to any one of the fifth aspect or the foregoing corresponding implementations, in another implementation of the fifth aspect, the CBR service data is OTN service data or SDH service data.

According to a sixth aspect, a transmitter is provided, including an obtaining module configured to obtain CBR service data, a first mapping module configured to map the CBR service data obtained by the obtaining module to an intermediate frame, where a rate of a PCS bitstream obtained by performing PCS encoding on the intermediate frame is equal to a total rate of N timeslots of a FlexE frame, an encoding module configured to perform PCS encoding on the intermediate frame obtained by the first mapping module, a second mapping module configured to map the PCS bitstream obtained by the encoding module to the N timeslots of the FlexE frame, and a sending module configured to send the FlexE frame, where FlexE overhead of the FlexE frame includes information used to indicate the N timeslots corresponding to the PCS bitstream.

With reference to the sixth aspect, in an implementation of the sixth aspect, the first mapping module is further configured to map the CBR service data to the intermediate frame using an AMP or a GMP, and add overhead of the AMP or overhead of the GMP to the intermediate frame.

With reference to either the sixth aspect or the foregoing corresponding implementation, in another implementation of the sixth aspect, the FlexE overhead further includes information indicating a sequence of a PHY device and/or information indicating a type of the CBR service data.

With reference to any one of the sixth aspect or the foregoing corresponding implementations, in another implementation of the sixth aspect, the encoding module is further configured to perform 64B/66B encoding, 256B/257B encoding, or 512B/513B encoding on the intermediate frame to obtain the PCS bitstream.

With reference to any one of the sixth aspect or the foregoing corresponding implementations, in another implementation of the sixth aspect, the CBR service data is OTN service data or SDH service data.

According to a seventh aspect, a receiver is provided, including a receiving module configured to receive a FlexE frame, where the FlexE frame includes a PCS bitstream corresponding to CBR service data, and FlexE overhead of the FlexE frame includes information used to indicate N timeslots of the FlexE frame that correspond to the PCS bitstream, a parsing module configured to obtain, from the N timeslots of the FlexE frame received by the receiving module and by means of parsing, the PCS bitstream including a rate adaptation code block according to the information used to indicate the N timeslots of the FlexE frame that correspond to the PCS bitstream, a deletion module configured to delete the rate adaptation code block in the PCS bitstream obtained by means of parsing by the parsing module, and a decoding module configured to perform PCS decoding on the PCS bitstream that is obtained by the deletion module and from which the rate adaptation code block is deleted, to obtain the CBR service data.

With reference to the seventh aspect, in an implementation of the seventh aspect, a quantity of rate adaptation code blocks included in the PCS bitstream is determined by a transmitter according to a rate of the PCS bitstream and a total rate of the N timeslots of the FlexE frame that are used to transmit the PCS bitstream.

With reference to either the seventh aspect or the foregoing corresponding implementation, in another implementation of the seventh aspect, the FlexE overhead further includes information indicating a quantity of bit blocks of the CBR service data in a specific FlexE frame period and/or information indicating a quantity of bits of the CBR service data in a specific FlexE frame period, and the deletion module is further configured to delete the rate adaptation code block in the PCS bitstream according to the information about a quantity of bit blocks and/or the information about a quantity of bits.

With reference to any one of the seventh aspect or the foregoing corresponding implementations, in another implementation of the seventh aspect, the rate adaptation code block is an idle code block.

With reference to any one of the seventh aspect or the foregoing corresponding implementations, in another implementation of the seventh aspect, the FlexE overhead further includes information indicating a sequence of a PHY device and/or information indicating a type of the CBR service data.

With reference to any one of the seventh aspect or the foregoing corresponding implementations, in another implementation of the seventh aspect, the decoding module is further configured to perform 64B/66B decoding, 256B/257B decoding, or 512B/513B decoding on the PCS bitstream from which the rate adaptation code block is deleted, to obtain the CBR service data.

With reference to any one of the seventh aspect or the foregoing corresponding implementations, in another implementation of the seventh aspect, the CBR service data is OTN service data or SDH service data.

According to an eighth aspect, a receiver is provided, including a receiving module configured to receive a FlexE FlexE frame, where the FlexE frame includes a PCS bitstream corresponding to CBR service data, and FlexE overhead of the FlexE frame includes information used to indicate N timeslots of the FlexE frame that correspond to the PCS bitstream, a parsing module configured to obtain, from the N timeslots of the FlexE frame received by the receiving module and by means of parsing, the PCS bitstream including a rate adaptation code block according to the information used to indicate the N timeslots of the FlexE frame that correspond to the PCS bitstream, a decoding module configured to perform PCS decoding on the PCS bitstream obtained by means of parsing by the parsing module, to obtain an intermediate frame, a processing module configured to obtain the mapped CBR service data from the intermediate frame obtained by the decoding module.

With reference to the eighth aspect, in an implementation of the eighth aspect, the CBR service data is mapped to the intermediate frame using an AMP or a GMP, and the intermediate frame includes overhead of the AMP or overhead of the GMP.

According to a ninth aspect, a transmitter is provided, including a processor, a memory, and a transceiver, where the memory is configured to store an instruction, the processor is configured to execute the instruction stored by the memory in order to control the transceiver to receive and send a signal, and when the processor executes the instruction stored by the memory, the transmitter is configured to perform the method according to any one of the first aspect or the implementations of the first aspect.

According to a tenth aspect, a transmitter is provided, including a processor, a memory, and a transceiver, where the memory is configured to store an instruction, the processor is configured to execute the instruction stored by the memory in order to control the transceiver to receive and send a signal, and when the processor executes the instruction stored by the memory, the transmitter is configured to perform the method according to any one of the second aspect or the implementations of the second aspect.

According to an eleventh aspect, a receiver is provided, including a processor, a memory, and a transceiver, where the memory is configured to store an instruction, the processor is configured to execute the instruction stored by the memory in order to control the transceiver to receive and send a signal, and when the processor executes the instruction stored by the memory, the transmitter is configured to perform the method according to any one of the third aspect or the implementations of the third aspect.

According to a twelfth aspect, a receiver is provided, including a processor, a memory, and a transceiver, where the memory is configured to store an instruction, the processor is configured to execute the instruction stored by the memory in order to control the transceiver to receive and send a signal, and when the processor executes the instruction stored by the memory, the transmitter is configured to perform the method according to any one of the fourth aspect or the implementations of the fourth aspect.

Based on the foregoing technical solutions, according to the data transmission method, the transmitter, and the receiver in the embodiments of the present disclosure, PCS encoding is performed on CBR service data, a rate adaptation code block is inserted in a PCS bitstream obtained by means of encoding such that a rate of the PCS bitstream in which the rate adaptation code block is inserted is adapted to a total rate of corresponding timeslots of a FlexE frame, FlexE overhead including related information about the CBR service data is added to the PCS bitstream, and then the PCS bitstream is sent. In this way, CBR service data may be mapped to a FlexE, and a carrying capability of the FlexE is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 5 is a schematic diagram of processing OTN service data according to an embodiment of the present disclosure;

FIG. 6 is a schematic diagram of an idle code block format according to an embodiment of the present disclosure;

FIG. 7A, FIG. 7B, and FIG. 7C are schematic diagrams of other idle code block formats according to an embodiment of the present disclosure;

FIG. 12 is a schematic flowchart of a data transmission method according to another embodiment of the present disclosure;

FIG. 13 is a schematic block diagram of a transmitter according to an embodiment of the present disclosure;

DESCRIPTION OF EMBODIMENTS

Figure 1:
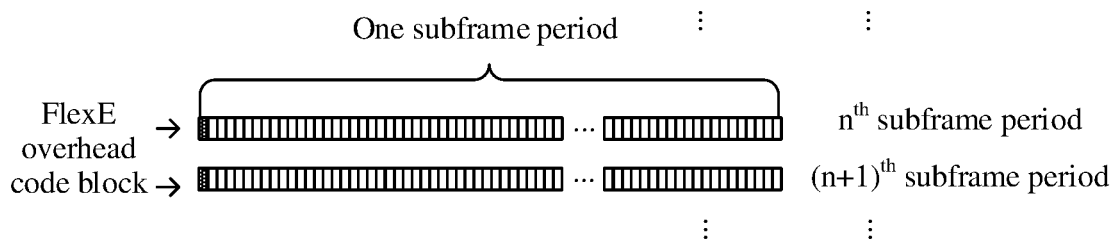
FIG. 1 is a schematic diagram of a data frame structure of a FlexE.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

First, related concepts in the embodiments of the present disclosure are briefly described.

FlexE: The FlexE is similar to an OTN, and has concepts of a FlexE client layer and a FlexE service layer. The FlexE client layer, such as 10 Gbit/s, 25 Gbit/s, 40 Gbit/s, and N*50 Gbit/s Ethernet interfaces, is mainly for aggregating client signals. The FlexE service layer is a functional layer mainly used to carry a FlexE client signal. Currently, the FlexE service layer is implemented mainly using N 100 GE PHY device, and may also be implemented using N 400 GE PHYs in the future.

CBR service: CBR service is a service whose bit rate is constant, and may include an OTN service, an SDH service, and the like.

PCS encoding: PCS encoding is a technology used to encode data in an Ethernet or a FlexE so as to obtain an encoding format complying with the Ethernet or the FlexE. The PCS encoding may include 64B/66B encoding, 256B/257B encoding, 512B/513B encoding, and the like.

PHY device: PHY device is mainly an Ethernet physical interface, and includes a PCS, a Physical Medium Attachment (PMA) sublayer, and a PMD sublayer.

Master calendar layer: Master calendar layer is a FlexE service layer structure with NxM consecutive Ethernet code blocks (such as 66B blocks). N represents a quantity of sub-calendar layers into which the master calendar layer needs to be split, and M represents a quantity of timeslots (i.e., Calendar Slot) supported by each sub-calendar layer. Generally, M=20.

Sub-calendar layer: Sub-calendar layer is each of N FlexE service layer structures obtained by splitting a master calendar layer. The sub-calendar layer has M consecutive Ethernet code blocks, and M represents a quantity of timeslots.

O code block: O code block is a 66B control code block defined in the Ethernet. A BT is indicated by BT=0×4B, and D1, D2, and D3 are data bytes in the O code block. An O field is included, and is used to indicate uses of D1, D2, and D3 in the code block. In the current Ethernet, O=0×0, and in the FlexE, it is planned that O=0×5.

For ease of understanding, the other approaches is briefly described first.

Introduction of a concept of a FlexE provides a feasible evolution direction for virtualization of an Ethernet physical connection. In the FlexE, one or more physical connections are bundled by means of cascading to form a physical connection group in order to obtain a bandwidth resource pool. Total bandwidth resources of the bandwidth resource pool are a sum of bandwidth resources of all physical connections in the physical connection group. From another perspective, the physical connection group may be considered as a high-speed logical connection implemented between a receive end and a transmit end. The logical connection has total bandwidth of physical interface connections bundled by means of cascading. The FlexE further divides the bandwidth resources of the physical connection group into some time division timeslots, and the timeslots are bundled by means of cascading to support some virtual connections such that data transmission in the Ethernet is highly flexible.

Each physical connection in the physical connection group transmits data in a period of a data frame. A subframe is used as an example. A start part of the subframe includes an overhead code block followed by 1024 groups of information code blocks. Each group of information code block usually includes 20 code blocks corresponding to 20 time division timeslot bandwidth resources respectively.

FIG. 1 shows a data frame structure of a FlexE. In FIG. 1, in a subframe period, a FlexE overhead code block (FlexE overhead) is followed by some information code blocks of a 64×66B structure, for example, 20480 information code blocks of the 64×66B structure. Some consecutive subframe periods (usually four subframes) form a basic frame. Some consecutive basic frames (usually 40 basic frames) form a super frame.

Figure 2:
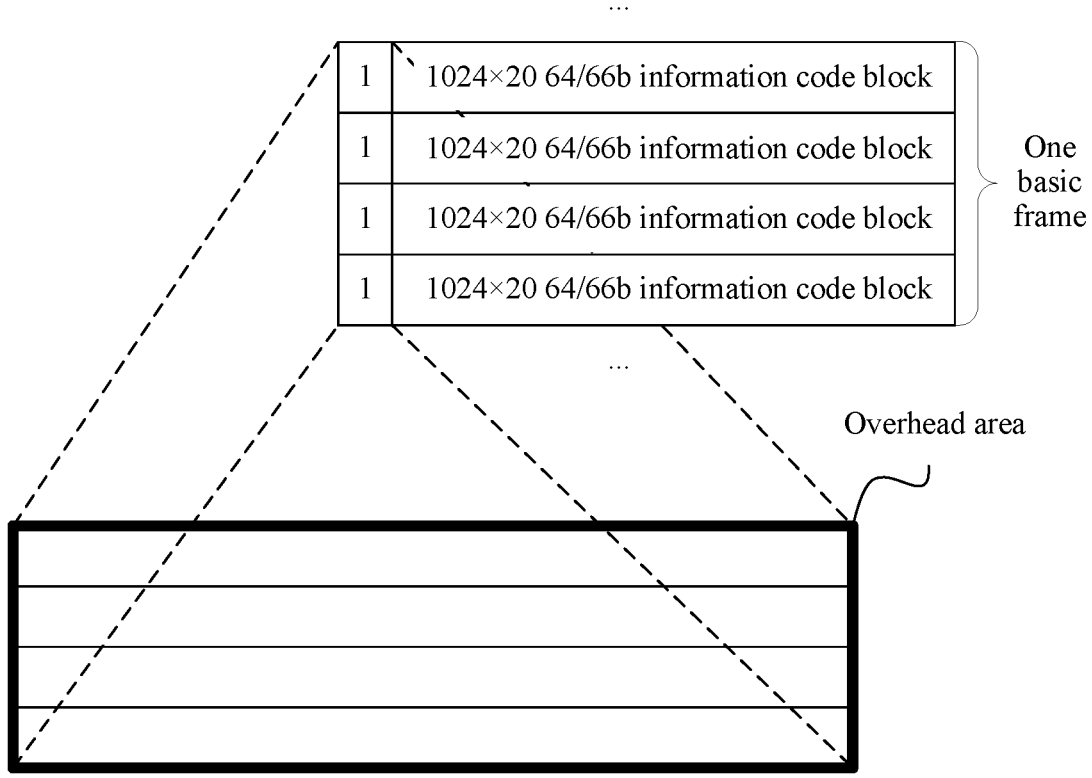
FIG. 2 is a schematic diagram of a periodical data frame structure of a FlexE.

In the other approaches, a sequence of a member in a physical connection group is identified in an overhead area that includes overhead code blocks. Further, in a process of transmitting a data flow by a transmit end to a receive end using a physical connection group, the transmit end distributes the data flow to all physical connections according to a sequence of each physical connection in the physical connection group. A physical connection in a more front sequence is responsible for transmitting a sub flow at a more front location in the whole data flow. After the data flow is distributed, each physical connection transmits a sub flow distributed to the physical connection. Each sub flow transmitted on a physical interface of the FlexE is transmitted in a data frame form. A data frame transmitted by each physical connection has a periodical structure shown in FIG. 2. One basic frame usually includes four subframes, an overhead code block is disposed at a head of each subframe, and there are a total of four overhead code blocks. An information code block of the FlexE usually includes 66 bits, and all 4×66 bits of the four overhead code blocks form an overhead area shown in FIG. 2. In the other approaches, the overhead area is used to indicate a configuration of a physical connection group. Table 1 shows a part of an overhead area (31 most significant bits) in the other approaches.

TABLE 1

Part of an overhead area in the other approaches

| SH | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 1 | 0 | | | | | 0 × 4B | | | | | | | | PHY Map | | | |
| 0 | 1 | | | FlexE Group Number | | | | | | | | | | | | | |
| 0 | 1 | | | Reserved | | | | | | | | | | | | | |
| 0 | 1 | | | | | | | | | | | | | | | | |
| | | 16 | 17 | 18 | 19 | 20 | 21 | 22 | 23 | 24 | 25 | 26 | 27 | 28 | 29 | 30 | 31 |
| | | | | | PHY Map | | | | | | | | This PHY | | | | |

This PHY is an identifier of this physical connection, and FlexE Group Number is an identifier of a physical connection group to which this physical connection belongs.

In the other approaches, the Ethernet is widely used as a service interface in an access network and a metropolitan area network, and therefore, the FlexE technology based on a service traffic aggregation function of the Ethernet technology can implement a seamless connection to an Ethernet interface of an underlying service network. Introduction of subrate, channelization, and inverse multiplexing functions of the FlexE significantly expands application scenarios of the Ethernet, improves flexibility of an Ethernet application, and makes the Ethernet technology gradually penetrate into the transport network field.

For multiplexing multiple Ethernet services (such as 10 GE, 25 GE, 40 GE, 100 GE, and the like), in the FlexE, as an expansion of the conventional Ethernet technology, a FlexE shim is newly defined for a FlexE service layer after an existing PCS in an 802.3 Ethernet architecture is defined by the IEEE such that the service layer aggregates traffic of a client layer. The foregoing FlexE architecture can only aggregate multiple Ethernet services.

The foregoing FlexE architecture needs to be based on a MAC frame of the Ethernet, and an idle code block defined in the Ethernet needs to be deleted to perform rate adaptation. Only multiple Ethernet services can be aggregated, and a service of another protocol cannot be carried. For example, a CBR service, such as an OTN service or an SDH service, has no MAC frame, and no idle frame is defined. Rate adaptation cannot be performed on the CBR service, and therefore, the OTN service or the SDH service cannot be mapped to the FlexE. Therefore, a technical problem of carrying a service such as the OTN service and/or the SDH service by the FlexE needs to be resolved.

The embodiments of the present disclosure aim at resolving the foregoing problem. A data transmission method in the embodiments of the present disclosure is described below in detail.

Figure 3:
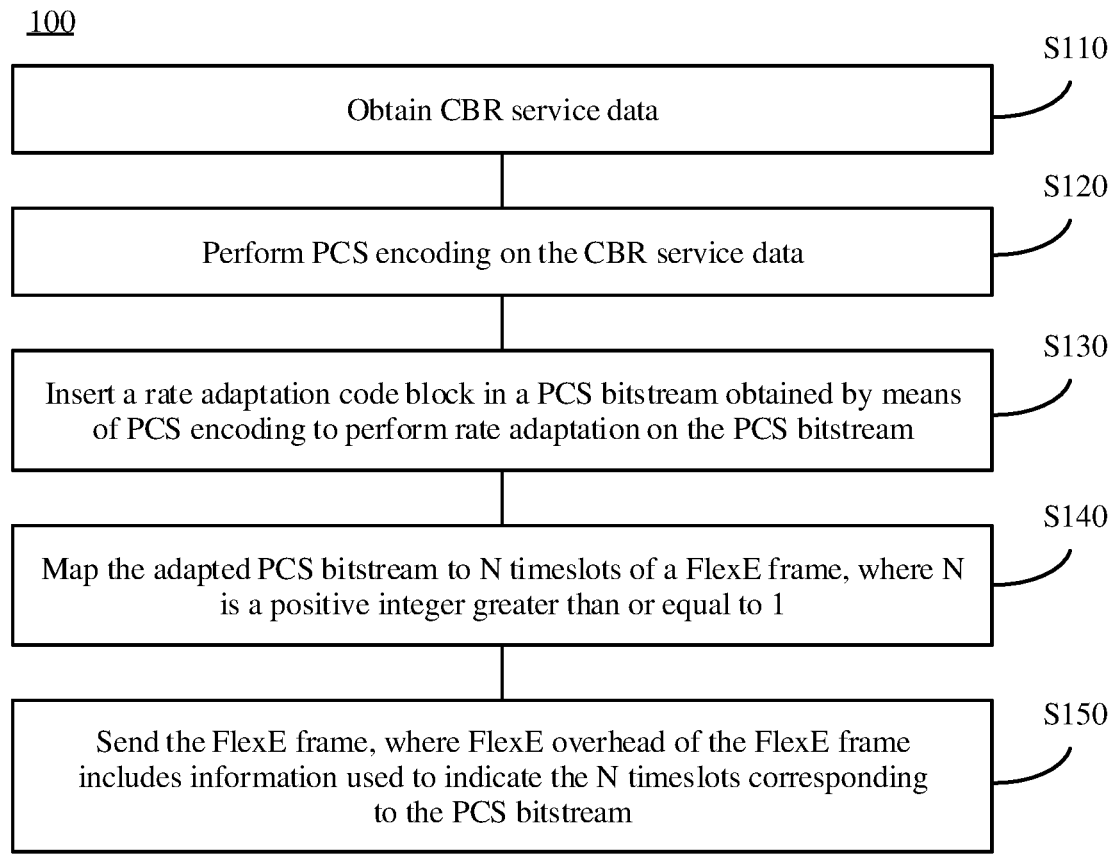
FIG. 3 is a schematic flowchart of a data transmission method according to an embodiment of the present disclosure.

FIG. 3 shows a data transmission method 100 according to an embodiment of the present disclosure. The method 100 is executed by a transmitter used for data transmission, and includes the following steps.

Step S110: Obtain CBR service data.

Step S120: Perform PCS encoding on the CBR service data.

Step S130: Insert a rate adaptation code block in a PCS bitstream obtained by means of PCS encoding to perform rate adaptation on the PCS bitstream.

Step S140: Map the adapted PCS bitstream to N timeslots of a FlexE frame, where N is a positive integer greater than or equal to 1.

Step S150: Send the FlexE frame, where FlexE overhead of the FlexE frame includes information used to indicate the N timeslots corresponding to the PCS bitstream.

Therefore, according to the data transmission method in this embodiment of the present disclosure, PCS encoding is performed on CBR service data, a rate adaptation code block is inserted in a PCS bitstream obtained by means of encoding such that a rate of the PCS bitstream in which the rate adaptation code block is inserted is adapted to a FlexE, FlexE overhead including related information about the CBR service data is added to the PCS bitstream, and then the PCS bitstream is sent. In this way, CBR service data may be mapped to a FlexE, and a carrying capability of the FlexE is improved.

Further, the CBR service data obtained in step S110 is service data from a network based on a CBR interface technology. For example, the CBR service data may be OTN service data from an OTN, may be SDH service data from an SDH, or may be other service data from a network based on the CBR interface technology. This is not limited in this embodiment of the present disclosure. The CBR service data from the OTN, the SDH, or the like may include FEC overhead for increasing a transmission distance, or may include no FEC overhead, and this is not limited in this embodiment of the present disclosure.

Optionally, step S110 in which the CBR service data is obtained includes receiving a CBR service data frame, where the data frame includes FEC overhead, performing error correction on the data frame according to the FEC overhead, and terminating the FEC overhead in the corrected data frame to obtain the CBR service data.

Further, in this embodiment of the present disclosure, the CBR service data frame may be received from an OTN network or an SDH network, or may be received from an apparatus, a node, or a device. A data frame sent by the OTN network or the SDH network may include FEC overhead. After the CBR service data frame is received, frame recognition may be performed to recognize the FEC overhead in the data frame, error correction is performed on the data frame according to the FEC overhead, then the FEC overhead in the data frame is terminated or deleted, and a remaining part is used as to-be-encoded CBR service data. In this way, FlexE timeslot bandwidth is not wasted.

In addition, frame recognition may not be performed, and the received data frame is directly used as to-be-encoded CBR service data. In this way, if the data frame includes FEC overhead, PCS encoding is also performed on the FEC overhead in a subsequent PCS encoding process. Terminating the FEC overhead can improve service data transmission efficiency in the FlexE, but damages service data transparency, and retaining the FEC overhead can maintain CBR service data transparency, but wastes a part of FlexE timeslot bandwidth.

It should be understood that in this embodiment of the present disclosure, after service data is received from the OTN or the SDH, corresponding processing may be performed on the service data. For example, after service data is received from the OTN, optical-to-electrical conversion first needs to be performed on the service data. In addition, if FEC overhead is to be terminated or deleted, recognition needs to be performed on a data frame of the received service data in order to accurately recognize the FEC overhead in the CBR service data. The foregoing processing may be implemented in some existing manners, and details are not described herein.

In step S120, PCS encoding is performed on the CBR service data to obtain the PCS bitstream complying with a FlexE encoding format. Further, a bitstream of the CBR service data whose FEC overhead is terminated or a bitstream of the CBR service data whose FEC overhead is retained may be divided into bit blocks, and then a synchronization header indication is added to the bit block.

Figure 4:
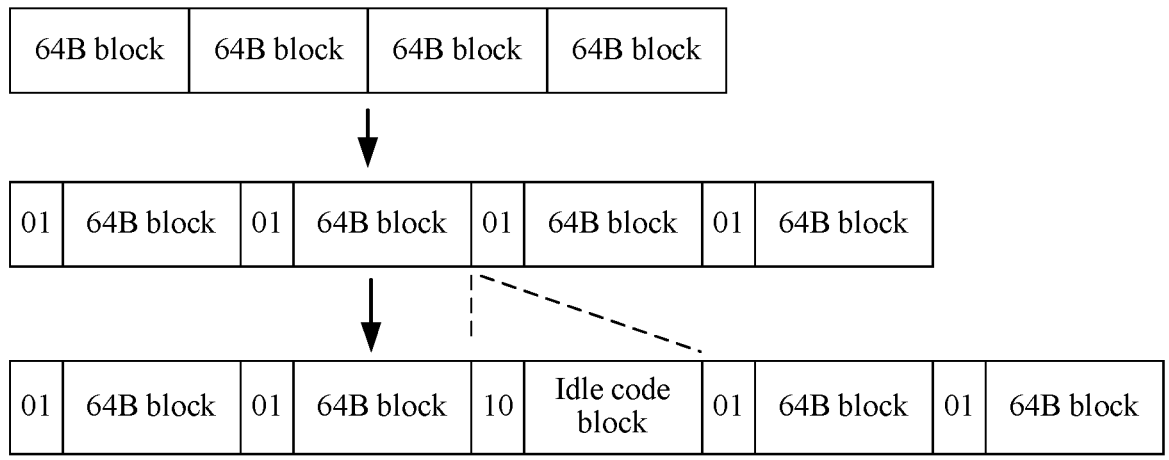
FIG. 4 is a schematic diagram of performing encoding according to a 64B/66B format according to an embodiment of the present disclosure.

For example, encoding may be performed on the CBR service data using a 64B/66B format widely used in the FlexE currently to obtain the PCS bitstream complying with the FlexE encoding format. Further, for performing 64B/66B encoding, the bitstream of the CBR service data first needs to be divided into multiple consecutive 64B blocks, and a two-bit synchronization header (Sync header) is added to each 64B block to form multiple 66B blocks. This is shown in FIG. 4. The multiple 66B blocks form the PCS bitstream. It should be understood that a FlexE service layer may also use more efficient 512B/513B encoding, and a PCS encoding manner is not limited in this embodiment of the present disclosure.

Steps S110 and S120 are described below when the CBR service data is OTN service data. In a specific example, obtaining the OTN service data includes obtaining an optical channel transport unit (OTUK) frame with FEC overhead, or obtaining an OTUCn frame without FEC overhead. As shown in FIG. 5, in a case of the OTUK frame, the FEC overhead (256 columns of FEC overhead at the back of the frame) in a 4080×4 frame structure of the OTUK frame may be first terminated to obtain an optical channel data unit (ODUK) frame, and then encoding is performed on the ODUK frame according to the 64B/66B format. Certainly, when the OTUK frame needs to be transparently transmitted, 64B/66B encoding may be directly performed without terminating the 256 columns of FEC overhead at the back. In a case of the OTUCn frame, encoding may be directly performed according to the 64B/66B format.

In this embodiment of the present disclosure, the N timeslots of the FlexE frame that are used to transmit the PCS bitstream need to be determined, where N is a positive integer greater than or equal to 1. Determining the N timeslots may include determining a quantity N of timeslots of the FlexE frame that are used to transmit the PCS bitstream, and determining locations of the N timeslots. The N timeslots of the FlexE frame that are used to transmit the PCS bitstream are timeslots that are of the FlexE frame and to which the PCS bitstream is to be mapped, or timeslots of the FlexE frame that are distributed for the PCS bitstream. The N timeslots of the FlexE frame that are used to transmit the PCS bitstream may be determined by the transmitter according to a configuration parameter in the transmitter, or may be determined according to a rate of the PCS bitstream. A total rate of the N timeslots should be greater than a rate of the CBR service data. For example, if the rate of the CBR service data is 10.4 Gbit/s, and a rate of each timeslot of the FlexE is 5 Gbit/s, three or more timeslots may be selected to carry the CBR service data.

In step S130, the rate adaptation code block is inserted in the PCS bitstream to perform rate adaptation. A specific quantity of inserted rate adaptation code blocks may be determined by the rate of the PCS bitstream and the total rate of the N timeslots of the FlexE frame that are used to transmit the PCS bitstream (for example, determined by a difference value or a ratio relationship between the rate of the PCS bitstream and the total rate of the N timeslots of the FlexE frame that are used to transmit the PCS bitstream), or may be determined using another parameter. This is not limited in this embodiment of the present disclosure. That is, a configuration parameter of the timeslot of the FlexE frame is first obtained, and then the timeslots (for example, N timeslots) of the FlexE frame that are occupied by the PCS bitstream are further determined according to the configuration parameter. It is necessary to ensure that the total rate of the timeslots of the FlexE frame that are distributed for the PCS bitstream is greater than or equal to the rate of the PCS bitstream. A difference between the total rate of the timeslots of the FlexE frame and the rate of the CBR service data is offset by the rate adaptation code block, and the adapted PCS bitstream is finally mapped to a corresponding timeslot of the FlexE frame.

Correspondingly, step S130 in which the rate adaptation code block is inserted in the PCS bitstream obtained by means of PCS encoding to perform rate adaptation on the PCS bitstream includes inserting the rate adaptation code block in the PCS bitstream according to the rate of the PCS bitstream and the total rate of the N timeslots of the FlexE frame that are used to transmit the PCS bitstream such that the PCS bitstream in which the rate adaptation code block is inserted can be mapped to the N timeslots of the FlexE frame that are used to transmit the PCS bitstream.

An idea of this embodiment of the present disclosure is performing PCS encoding on non-Ethernet CBR service data, and then transmitting the data in the FlexE. Therefore, a location of a rate adaptation code block inserted to perform rate adaptation is not limited. That is, regardless of a location of the rate adaptation code block in the PCS bitstream, the rate adaptation code block can be correctly recognized using a synchronization header in PCS encoding, and therefore, transmission and receiving of the CBR service data is not affected.

It should be understood that the rate adaptation code block is an idle code block. The rate adaptation code block may also be a control code block other than the idle code block.

When encoding is performed using the 64B/66B format, encoding may comply with a definition in the IEEE 802.3 standard. Sync header=01 indicates that this 66B code block is a data block obtained by performing encoding on CBR service data, and sync header=10 indicates that this 66B code block is a control code block (such as a rate adaptation code block). To recognize that the control code block is a FlexE overhead code block, an idle code block, or another code block, recognition further needs to be performed on a block type (BT) field or another field in the 66B code block. Optionally, (BT=0×1e) in the 66B control code block may be used as an idle code block, that is, the idle code block inserted to perform rate adaptation. That is, a 64B block after sync header=10 is idle.

FIG. 6 shows a possible idle code block format in which Sync header=10 occupies two bits, BT=0×1e occupies eight bits, and each of other control bytes 0×00 occupies seven bits. It should be understood that a value filled in an idle code block is 0×07 on a Media Independent Interface (MII), and 0×07 is translated into 0×00 at a PCS.

Optionally, when encoding is performed using the 64B/66B format, there is also another idle encoding scheme. For example, when sync=10, another value may be used as a BT value, for example, BT=0×87 (as shown in FIG. 7A), BT=0×99 (as shown in FIG. 7B), or BT=0×AA (as shown in FIG. 7C). In addition, an idle control character with a finer granularity, such as a D byte (such as D0 and D1) shown in FIG. 7B or FIG. 7C, may be used for data transmission. A byte in a shadow area is an invalid part and not recognized, and a remaining control byte is filled with 0×00 to identify an idle character. In addition, optionally, insertion (or related deletion on a receiver side) of an idle code block may conform to a limitation on an Ethernet idle code block in the IEEE 802.3 standard. It should be understood that there may be various idle encoding schemes and insertion and deletion manners. The transmitter and the receiver may reach an agreement such that the receiver can correctly perform decoding after the transmitter performs encoding.

It should be understood that when the FlexE service layer uses more efficient 256B/257B encoding or 512B/513B encoding, accordingly, an idle code block is also encoded using a 256B/257B format or a 512B/513B format. A specific implementation in which the FlexE service layer performs encoding using another format is similar to that of 64B/66B encoding described above, and details are not described herein again.

All timeslots of the FlexE are finally distributed to multiple PHYs, and some timeslots of the FlexE carry the PCS bitstream on which rate adaptation is performed. It should be understood that after the PCS bitstream is mapped and distributed to a PHY, related information about the CBR service data should be recorded, for example, a PHY to which the CBR service data is mapped, and a timeslot to which the PCS bitstream is mapped such that the receiver is notified, and original CBR service data can be recovered by the receiver.

Then, in step S150, the FlexE frame is sent to the receiver using at least one PHY device. The FlexE overhead transmitted using the at least one PHY includes information used to indicate the N timeslots corresponding to the PCS bitstream of the CBR service data. The receiver is notified of the information such that the receiver can recognize a PHY on which the CBR service data is located and a timeslot of the FlexE frame, and the original CBR service data can be recovered.

It should be understood that the at least one PHY is all PHYs in a physical connection group, and the transmitter sends the PCS bitstream using the physical connection group. The information about the N timeslots corresponding to the CBR service data may be carried in FlexE overhead of a PHY transmitting the CBR service data, may be carried in FlexE overhead of all PHYs in the physical connection group, or may be carried in FlexE overhead of a specific PHY. This is not limited in this embodiment of the present disclosure.

In addition, the FlexE overhead may further include information indicating a sequence of a PHY and/or information indicating a type of the CBR service data. Therefore, the receiver can recover the original CBR service data in sequence according to the sequence of the PHY, or the receiver can distinguish the CBR service data from multiple pieces of data according to the information about the type of the CBR service data.

Optionally, in this embodiment of the present disclosure, multiple timeslots of the FlexE form a master calendar layer of the FlexE, and after the adapted PCS bitstream is mapped to the N timeslots of the FlexE, the method further includes dividing the master calendar layer of the FlexE into multiple sub-calendar layers by means of polling, where each sub-calendar layer forms one PHY.

Further, the FlexE service layer may use a Time Division Multiplexing (TDM) framing technology that is based on PCS encoding. For example, the FlexE service layer may include a master calendar layer whose length is consecutive N×20 66B blocks. The master calendar layer has N×20 timeslots in a unit of a 66B block. Every 20 timeslots, that is, 20 66B blocks, are corresponding to one sub-calendar layer.

Figures 8, 9:
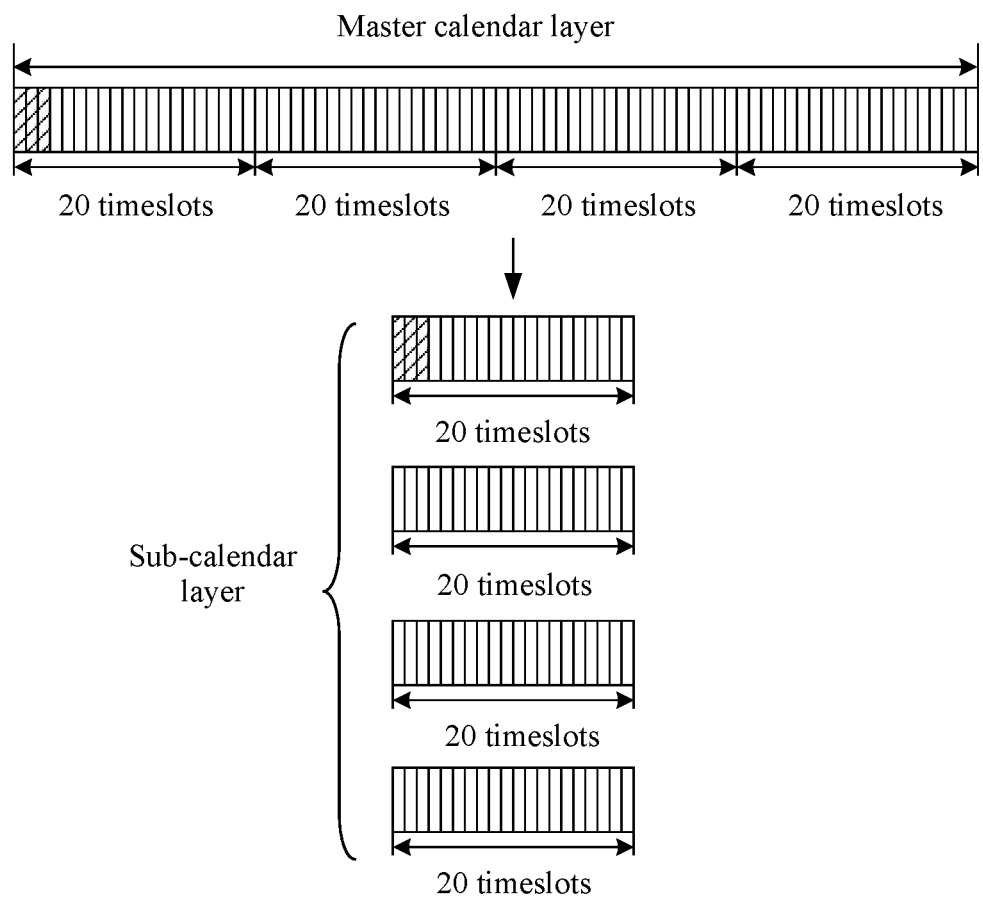
FIG. 8 is a schematic diagram of distributing a PHY according to an embodiment of the present disclosure.
FIG. 9 is a schematic diagram of FlexE overhead according to an embodiment of the present disclosure.

In this embodiment of the present disclosure, the PCS bitstream on which rate adaptation is performed is mapped to some specific timeslots of the FlexE service layer. For example, as shown in FIG. 8, the PCS bitstream may be mapped to the first three timeslots (that is, the first three 66B blocks) of the first sub-calendar layer shown by a shadow area. Another timeslot of the master calendar layer may carry other data. Then, the master calendar layer with the consecutive N×20 66B blocks is distributed to N sub-calendar layers by means of polling, and each sub-calendar layer forms one PHY. After one group of N×20 66B blocks are distributed, another group of N×20 66B blocks continue to be sent. In this way, each PHY forms a structure with multiple consecutive 20 66B blocks. If the FlexE service layer is implemented when each PHY is 100 GE, bandwidth of each timeslot is about 5 Gbit/s.

It should be understood that the PCS bitstream on which rate adaptation is performed may be mapped to timeslots of only one sub-calendar layer, and finally sent using one PHY, or the PCS bitstream on which rate adaptation is performed may be mapped to timeslots of multiple sub-calendar layers, and finally sent using multiple PHYs. This is not limited in this embodiment of the present disclosure.

It should be further understood that the FlexE adds FlexE overhead to each PHY in order to identify a FlexE frame structure, to identify a sequence of each PHY, to identify a correspondence between CBR service data and a timeslot, to identify a type of CBR service data, and the like. Further, for each PHY of the FlexE, FlexE overhead of each PHY is inserted at a specific frequency or using a specific quantity (such as 1024) of 20×66B code blocks as a period. The FlexE overhead may be one type of 66B control code block. For example, an O code block may be used to identify and transmit overhead. As shown in FIG. 9, an O code block that is a 66B control code block and whose BT=0×4B and O=0×5 is used. D1, D2, and D3 of the O code block may be used to define various functions of the overhead. A variation of the O code block may also be used. For example, a reserved 0×000_0000 field may also be used as a part of the FlexE overhead. Optionally, the FlexE overhead may be another type of 66B control code block, such as an S code block whose BT=0×78. Optionally, the FlexE overhead may be carried using a combination of an O code block in 66B control code blocks and a data code block whose sync=01, or the FlexE overhead may be carried using a combination of an S code block in 66B control code blocks and a data code block whose sync=01. A specific overhead scheme is not limited in the present disclosure.

A client port field may be used to identify the correspondence between CBR service data and a timeslot, and a client type field may be used to identify the type of the CBR service data. All fields of an O code block are cyclically distributed according to the foregoing period. For example, Table 2 shows 24 bits corresponding to D1, D2, and D3 of the O code block. Fields such as client type, #PHYs, and This PHY are transmitted in the O code block in the first period, client port and information about a part of management channels are transmitted in the O code block in the second period, information about a remaining part of management channels is transmitted in the O code block in the third period, and information such as reserved and CRC-8 is transmitted in the O code block in the fourth period. Information about the whole FlexE overhead may be obtained by combining O code blocks in the four periods.

TABLE 2

| 24 bits corresponding to D1, D2, and D3 of an O code block | | | | | | | | | | | | | | | | | | | | | | | |
|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 0 | 0 | C | PC | Client type | | | | | | | #PHYs | | | | | | | This PHY | | | | | |
| 0 | 1 | C | | Client port | | | | | | | | | | | | | | | | | | | |
| 1 | 0 | C | | Management channel | | | | | | | | | | | | | | | | | | | |
| 1 | 1 | | Reserved | | | | | | | | | | | | | | | CRC-8 | | | | | |

Optionally, in this embodiment of the present disclosure, the FlexE overhead further includes information indicating a ratio (or a difference) between the rate of the CBR service data and the total rate of the N timeslots of the FlexE frame that are used to transmit the PCS bitstream. The rate herein is a bit rate.

Further, in this embodiment of the present disclosure, transmission of some CBR service data requires clock transparency. However, a manner in which rate adaptation is performed by only inserting an idle code block cannot provide clock transparency. Therefore, when using the manner in this embodiment of the present disclosure to insert the idle code block in the PCS bitstream and map the PCS bitstream to the FlexE, the transmitter may perform comparison between the rate of the CBR service data and the total rate of the N timeslots of the FlexE frame in order to obtain information about a ratio between the bit rates of the two, and add the information indicating the ratio between the bit rates to the FlexE overhead.

Optionally, for obtaining the information about the ratio between the bit rates of the two, a quantity of bit blocks (such as a quantity in a unit of an 8-bit block, or a quantity in a unit of a bit block of another size such as 16 bits or 32 bits) of CBR service data that can be transmitted in a specific FlexE frame period may be calculated, and then information about the quantity of bit blocks is inserted in the FlexE overhead in real time. The information about the quantity of bit blocks can represent in real time the ratio of the rate of the CBR service data to the total rate of the N timeslots of the FlexE frame that are used to transmit the PCS bitstream.

Optionally, more accurately, information about a quantity of bits of CBR service data in a specific FlexE frame period may be added in real time to the information that is about the quantity of bit blocks and that is described above, and the information about the quantity of bit blocks in the period and the information about the quantity of bits are separately inserted in some fields of the FlexE overhead in order to represent clock information in real time. It should be understood that in this embodiment of the present disclosure, the ratio information may include only the information about the quantity of bits of the CBR service data in the specific FlexE frame period.

Accordingly, the FlexE overhead further includes the information indicating the quantity of bit blocks of the CBR service data in the specific FlexE frame period and/or the information indicating the quantity of bits of the CBR service data in the specific FlexE frame period.

The receiver obtains, from the FlexE overhead by means of parsing, the information about the quantity of bit blocks of the CBR service data transmitted in the specific FlexE frame period. When higher clock accuracy needs to be provided, the information about the quantity of bits of the CBR service data transmitted in the specific FlexE frame period is obtained from the FlexE overhead by means of parsing. In this way, clock information based on a bit block or based on a bit is obtained. An original clock of the CBR service data is recovered according to the obtained information, and the CBR service data is recovered still according to the method in this embodiment of the present disclosure.

Optionally, in this embodiment of the present disclosure, step S150 in which the PCS bitstream is sent to the receiver using at least one PHY device includes splitting each PHY in the at least one PHY, separately adding Alignment Marker (AM) overhead to multiple PHY branches obtained by splitting, and sending the PCS bitstream to the receiver using the multiple PHY branches.

Each PHY including the FlexE overhead may further be split, the AM overhead is added, the multiple PHY branches obtained by splitting are aligned, and then the PCS bitstream is sent in the multiple PHY branches concurrently, thereby further improving data transmission efficiency.

Therefore, according to the data transmission method in this embodiment of the present disclosure, PCS encoding is performed on CBR service data, a rate adaptation code block is inserted in a PCS bitstream obtained by means of encoding such that a rate of the PCS bitstream in which the rate adaptation code block is inserted is adapted to a FlexE, FlexE overhead including related information about the CBR service data is added to the PCS bitstream, and then the PCS bitstream is sent. In this way, CBR service data may be mapped to a FlexE, and a carrying capability of the FlexE is improved.

It should be understood that sequence numbers of the foregoing processes do not mean execution sequences. Execution sequences of the processes should be determined according to functions and internal logic of the processes, and shall not set any limitation on implementation processes of the embodiments of the present disclosure.

Figure 10:
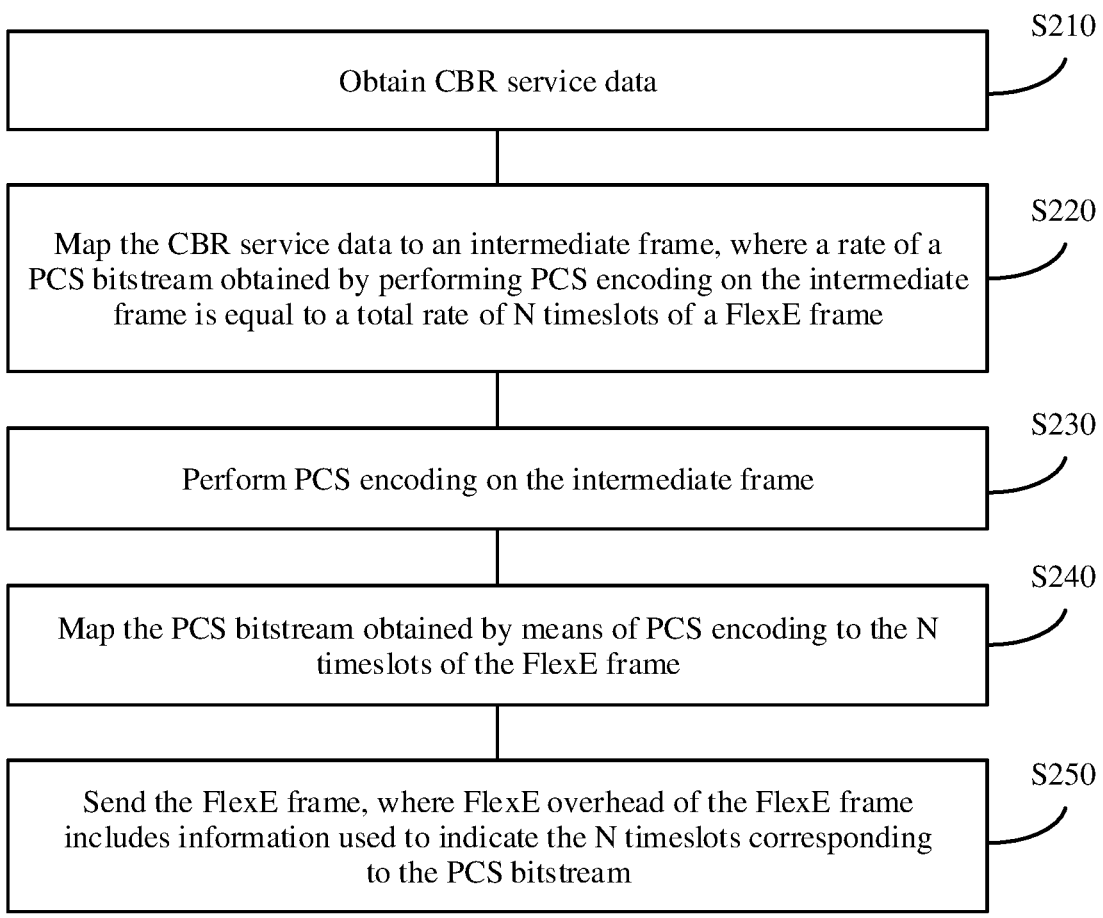
FIG. 10 is a schematic flowchart of a data transmission method according to another embodiment of the present disclosure.

FIG. 10 shows a data transmission method 200 according to another embodiment of the present disclosure. As shown in FIG. 10, the method 200 includes the following steps.

Step S210: Obtain CBR service data.

Step S220: Map the CBR service data to an intermediate frame, where a rate of a PCS bitstream obtained by performing PCS encoding on the intermediate frame is equal to a total rate of N timeslots of a FlexE frame.

Step S230: Perform PCS encoding on the intermediate frame.

Step S240: ap the PCS bitstream obtained by means of PCS encoding to the N timeslots of the FlexE frame.

Step S250: Send the FlexE frame, where FlexE overhead of the FlexE frame includes information used to indicate the N timeslots corresponding to the PCS bitstream.

Therefore, according to the data transmission method in this embodiment of the present disclosure, CBR service data is mapped to an intermediate frame, the intermediate frame is used to adjust a rate such that a rate of a PCS bitstream obtained by performing PCS encoding on the intermediate frame is adapted to a total rate of corresponding timeslots of a FlexE frame, then the PCS bitstream obtained by means of encoding is distributed to a PHY, FlexE overhead is added to the PCS bitstream, and then the PCS bitstream is sent. In this way, CBR service data may be mapped to a FlexE, and a carrying capability of the FlexE is improved.

Further, in the embodiment describing the method 100, a scheme in which a rate adaptation code block (such as an idle code block) is inserted to perform rate adaptation is used. The method 200 mainly describes a scheme in which rate adaptation is performed without using a rate adaptation code block. The CBR service data is first obtained, and the N timeslots of the FlexE frame that are used to transmit the CBR service data are determined according to a configuration parameter. Then, a CBR service is mapped to the intermediate frame, and the intermediate frame includes an overhead area and a payload area, and can adapt service data to a service layer such that after PCS encoding, a rate of the intermediate frame is adapted to the total rate of the N timeslots of the FlexE frame that are occupied by the intermediate frame. The intermediate frame may have a TDM frame structure, or may have another frame structure, and this is not limited in this embodiment of the present disclosure.

Optionally, in this embodiment of the present disclosure, step S230 in which the CBR service data is mapped to the intermediate frame includes mapping the CBR service data to the intermediate frame using an AMP or a GMP, and adding overhead of the AMP or overhead of the GMP to the intermediate frame.

Further, the CBR service data may be mapped to the intermediate frame using an AMP, or using a GMP. Correspondingly, the overhead of the AMP is added to the intermediate frame if mapping is performed using the AMP, or the overhead of the GMP is added if mapping is performed using the GMP. Preferably, the CBR service data may be mapped to an intermediate frame with a TDM frame structure.

It should be understood that the mapping the CBR service data to the intermediate frame may be performed according to a rate of the CBR service data and the total rate of the N timeslots of the FlexE frame that are used to transmit the CBR service data such that the PCS bitstream obtained by performing PCS encoding on the intermediate frame can be mapped to the N timeslots of the FlexE frame.

After the intermediate frame is obtained, PCS encoding is performed on the intermediate frame to obtain the PCS bitstream. For example, data of the intermediate frame is divided into 64B blocks, and a 2-bit Sync header is added to form a 66B bitstream. Sync header=01 indicates that the 64B blocks are data blocks. Then, the 66B blocks are inserted in a timeslot configured in the FlexE. This step and a subsequent step are similar to subsequent steps in the method 100, and details are not described herein again. It should be understood that the FlexE overhead including at least one PHY signal of the CBR service data may further include information indicating a sequence of a PHY and information identifying a type of the CBR service data.

Optionally, in this embodiment of the present disclosure, the FlexE overhead further includes information indicating a sequence of a PHY and/or information indicating a type of the CBR service data.

Optionally, in this embodiment of the present disclosure, performing PCS encoding on the intermediate frame includes performing 64B/66B encoding, 256B/257B encoding, or 512B/513B encoding on the intermediate frame, to obtain the PCS bitstream.

Optionally, in this embodiment of the present disclosure, the CBR service data is OTN service data or SDH service data.

In addition, if the CBR service data has a specific frame structure and has a specific frame header indication, a frame header of the CBR service data may be first recognized, and a padding byte with a specific pattern is inserted in a trailer of a frame of the CBR service data such that rate adaptation is performed on the CBR service data, and after PCS encoding is performed, a rate of the CBR service data to which the padding byte with the specific pattern is added is adapted to a total rate of timeslots of the FlexE frame that are occupied by the CBR service data. The filled specific pattern should be different from the frame header of the CBR service data such that the receiver can recognize the pattern, thereby recovering original CBR service data.

Therefore, according to the data transmission method in this embodiment of the present disclosure, CBR service data is mapped to an intermediate frame, the intermediate frame is used to adjust a rate such that a rate of a PCS bitstream obtained by performing PCS encoding on the intermediate frame is adapted to a total rate of corresponding timeslots of a FlexE frame, then the PCS bitstream obtained by means of encoding is distributed to a PHY, FlexE overhead is added to the PCS bitstream, and then the PCS bitstream is sent. In this way, CBR service data may be mapped to a FlexE, and a carrying capability of the FlexE is improved.

It should be understood that sequence numbers of the foregoing processes do not mean execution sequences. Execution sequences of the processes should be determined according to functions and internal logic of the processes, and shall not set any limitation on implementation processes of the embodiments of the present disclosure.

With reference to FIG. 3 to FIG. 10, the data transmission methods in the embodiments of the present disclosure are described in detail from a transmitter perspective, and a data transmission method in an embodiment of the present disclosure is described below from a receiver perspective.

Figure 11:
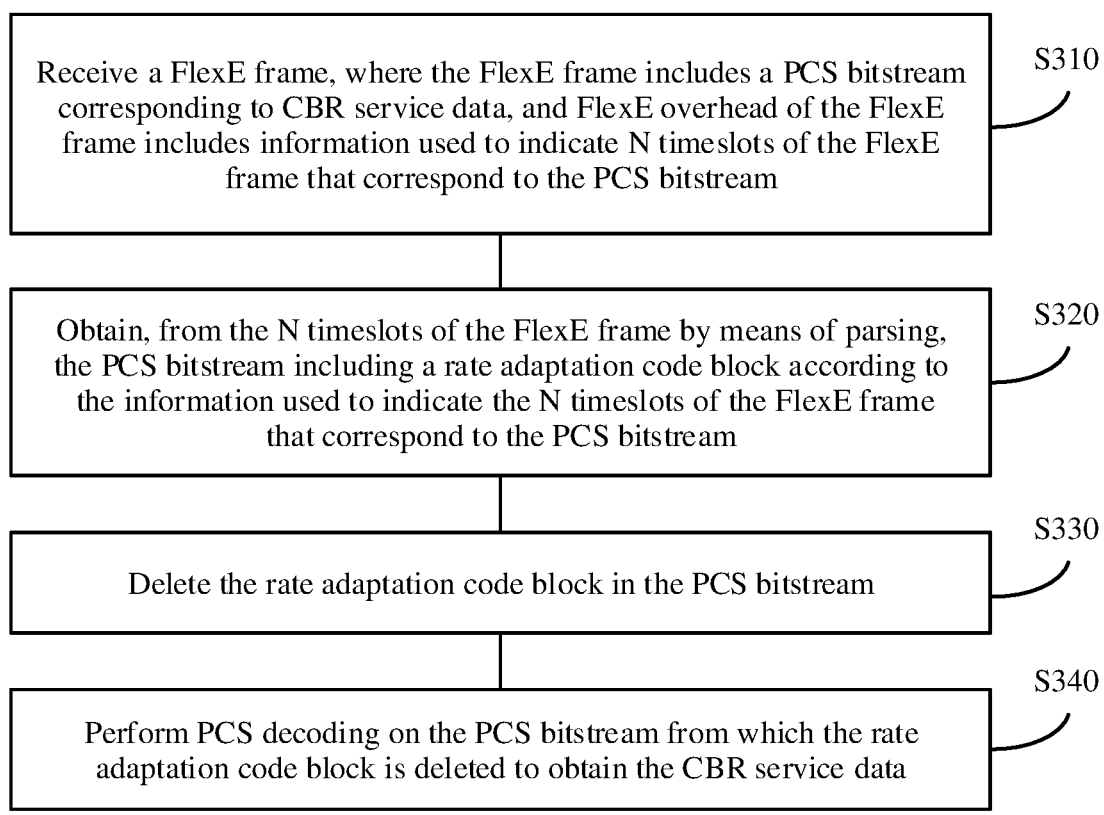
FIG. 11 is a schematic flowchart of a data transmission method according to another embodiment of the present disclosure.

FIG. 11 shows a schematic flowchart of a data transmission method 300 according to still another embodiment of the present disclosure. The method 300 is executed by a receiver, and corresponds to the method 100 that is described above and that is executed by a transmitter. The method 300 includes the following steps.

Step S310: Receive a FlexE frame, where the FlexE frame includes a PCS bitstream corresponding to CBR service data, and FlexE overhead of the FlexE frame includes information used to indicate N timeslots of the FlexE frame that correspond to the PCS bitstream.

Step S320: Obtain, from the N timeslots of the FlexE frame by means of parsing, the PCS bitstream including a rate adaptation code block according to the information used to indicate the N timeslots of the FlexE frame that correspond to the PCS bitstream.

Step S330: Delete the rate adaptation code block in the PCS bitstream.

Step S340: Perform PCS decoding on the PCS bitstream from which the rate adaptation code block is deleted to obtain the CBR service data.

Therefore, according to the data transmission method in this embodiment of the present disclosure, a FlexE frame is received, timeslots of the FlexE frame that correspond to CBR service data are determined according to information that is included in FlexE overhead and that indicates a correspondence between a PCS bitstream and a timeslot, a PCS bitstream including a rate adaptation code block is obtained from the timeslots by means of parsing, the rate adaptation code block in the PCS bitstream is deleted, and PCS decoding is performed on the bitstream from which the rate adaptation code block is deleted, to obtain the CBR service data. In this way, CBR service data may be mapped to a FlexE, and a carrying capability of the FlexE is improved.

Further, the receiver receives the FlexE frame from a transmitter using at least one PHY, recognizes FlexE PCS encoding (for example, 64B/66B encoding), and may obtain each PHY signal of the FlexE after parsing AM overhead and performing alignment. Then, FlexE overhead of each PHY signal is parsed, and the FlexE overhead may include information such as a sequence of a PHY, a correspondence between a timeslot and a PCS bitstream corresponding to the CBR service data, and a type of the CBR service data. According to the foregoing FlexE overhead, the receiver may recover a sorting sequence of each PHY, obtain, from the corresponding timeslots of the FlexE by means of parsing, the PCS bitstream including the rate adaptation code block, and recover original CBR service data after deleting the rate adaptation code block and performing decoding.

Optionally, in this embodiment of the present disclosure, a quantity of rate adaptation code blocks included in the PCS bitstream is determined by the transmitter according to a rate of the PCS bitstream and a total rate of the N timeslots of the FlexE frame that are used to transmit the PCS bitstream.

Optionally, in this embodiment of the present disclosure, the FlexE overhead further includes information indicating a quantity of bit blocks of the CBR service data in a specific FlexE frame period and/or information indicating a quantity of bits of the CBR service data in a specific FlexE frame period.

Deleting the rate adaptation code block in the PCS bitstream includes deleting the rate adaptation code block in the PCS bitstream according to the information about a quantity of bit blocks and/or the information about a quantity of bits.

Optionally, in this embodiment of the present disclosure, the rate adaptation code block is an idle code block.

Optionally, in this embodiment of the present disclosure, the FlexE overhead further includes information indicating a sequence of a PHY and/or information indicating a type of the CBR service data.

Optionally, in this embodiment of the present disclosure, step S340 in which PCS decoding is performed on the PCS bitstream from which the rate adaptation code block is deleted to obtain the CBR service data includes performing 64B/66B decoding, 256B/257B decoding, or 512B/513B decoding on the PCS bitstream from which the rate adaptation code block is deleted, to obtain the CBR service data.

Optionally, in this embodiment of the present disclosure, step S310 in which the FlexE frame is received includes receiving PHY branches from a transmitter, where each of the PHY branches includes AM overhead, and combining multiple PHY branches into at least one PHY according to the AM overhead, where the at least one PHY signal includes the PCS bitstream.

Optionally, in this embodiment of the present disclosure, the CBR service data is OTN service data or SDH service data.

Therefore, according to the data transmission method in this embodiment of the present disclosure, a FlexE frame is received, timeslots of the FlexE frame that correspond to CBR service data are determined according to information that is included in FlexE overhead and that indicates a correspondence between a PCS bitstream and a timeslot, a PCS bitstream including a rate adaptation code block is obtained from the timeslots by means of parsing, the rate adaptation code block in the PCS bitstream is deleted, and PCS decoding is performed on the bitstream from which the rate adaptation code block is deleted to obtain the CBR service data. In this way, CBR service data may be mapped to a FlexE, and a carrying capability of the FlexE is improved.

It should be understood that sequence numbers of the foregoing processes do not mean execution sequences. Execution sequences of the processes should be determined according to functions and internal logic of the processes, and shall not set any limitation on implementation processes of the embodiments of the present disclosure.

It should be further understood that the receiver in this embodiment of the present disclosure may be corresponding to the receiver in the method 100. Operations and/or functions executed in the method 300 may be considered as inverse operations of corresponding procedures in the method 100. For brevity, details are not described herein.

FIG. 12 shows a schematic flowchart of a data transmission method 400 according to still another embodiment of the present disclosure. The method 400 is executed by a receiver, and corresponds to the method 200 that is described above and that is executed by a transmitter. The method 400 includes the following steps.

Step S410: Receive a FlexE frame, where the FlexE frame includes a PCS bitstream corresponding to CBR service data, and FlexE overhead of the FlexE frame includes information used to indicate N timeslots of the FlexE frame that correspond to the PCS bitstream.

Step S420: Obtain, from the N timeslots of the FlexE frame by means of parsing, the PCS bitstream including a rate adaptation code block according to the information used to indicate the N timeslots of the FlexE frame that correspond to the PCS bitstream.

Step S430: Perform PCS decoding on the PCS bitstream to obtain an intermediate frame.

Step S440: Obtain the mapped CBR service data from the intermediate frame.

Therefore, according to the data transmission method in this embodiment of the present disclosure, a FlexE frame is received, timeslots of the FlexE frame that correspond to CBR service data are determined according to information that is included in FlexE overhead and that indicates a correspondence between a PCS bitstream and a timeslot, and an intermediate frame is obtained from the timeslots by means of parsing to obtain the CBR service data. In this way, CBR service data may be mapped to a FlexE, and a carrying capability of the FlexE is improved.

Optionally, in this embodiment of the present disclosure, the CBR service data is mapped to the intermediate frame using an AMP or a GMP, and the intermediate frame includes overhead of the AMP or overhead of the GMP.

Optionally, in this embodiment of the present disclosure, the FlexE overhead further includes information indicating a sequence of a PHY and/or information indicating a type of the CBR service data.

Optionally, in this embodiment of the present disclosure, step S430 in which PCS decoding is performed on the PCS bitstream to obtain the intermediate frame includes performing 64B/66B decoding, 256B/257B decoding, or 512B/513B decoding on the PCS bitstream to obtain the intermediate frame.

Optionally, in this embodiment of the present disclosure, the CBR service data is OTN service data or SDH service data.

Optionally, in this embodiment of the present disclosure, step S410 in which the FlexE frame is received includes receiving PHY branches from a transmitter, where each of the PHY branches includes AM overhead, and combining multiple PHY branches into at least one PHY according to the AM overhead, where the at least one PHY signal includes the PCS bitstream.

Therefore, according to the data transmission method in this embodiment of the present disclosure, a FlexE frame is received, timeslots of the FlexE frame that correspond to CBR service data are determined according to information that is included in FlexE overhead and that indicates a correspondence between a PCS bitstream and a timeslot, and an intermediate frame is obtained from the timeslots by means of parsing to obtain the CBR service data. In this way, CBR service data may be mapped to a FlexE, and a carrying capability of the FlexE is improved.

It should be understood that sequence numbers of the foregoing processes do not mean execution sequences. Execution sequences of the processes should be determined according to functions and internal logic of the processes, and shall not set any limitation on implementation processes of the embodiments of the present disclosure.

It should be further understood that the receiver in this embodiment of the present disclosure may be corresponding to the receiver in the method 200. Operations and/or functions executed in the method 400 may be considered as inverse operations of corresponding procedures in the method 200. For brevity, details are not described herein.

The data transmission methods in the embodiments of the present disclosure are described above in detail, and a transmitter and a receiver according to embodiments of the present disclosure are described below in detail with reference to FIG. 13 to FIG. 20.

FIG. 13 shows a schematic block diagram of a transmitter 500 according to an embodiment of the present disclosure. The transmitter 500 corresponds to an execution body of the method 100, and the transmitter 500 includes an obtaining module 510 configured to obtain CBR service data, an encoding module 520 configured to perform PCS encoding on the CBR service data obtained by the obtaining module 510, a rate adaptation module 530 configured to insert a rate adaptation code block in a PCS bitstream obtained by the encoding module 520 to perform rate adaptation on the PCS bitstream, a mapping module 540 configured to map the PCS bitstream adapted by the rate adaptation module 530 to N timeslots of a FlexE frame, where N is a positive integer greater than or equal to 1, and a sending module 550 configured to send the FlexE frame, where FlexE overhead of the FlexE frame includes information used to indicate the N timeslots corresponding to the PCS bitstream.

Therefore, the transmitter 500 in this embodiment of the present disclosure performs PCS encoding on CBR service data, inserts a rate adaptation code block in a PCS bitstream obtained by means of encoding such that a rate of the PCS bitstream in which the rate adaptation code block is inserted is adapted to a FlexE, adds FlexE overhead including related information about the CBR service data to the PCS bitstream, and then sends the PCS bitstream. In this way, CBR service data may be mapped to a FlexE, and a carrying capability of the FlexE is improved.

Optionally, in this embodiment of the present disclosure, the rate adaptation module 530 is further configured to insert the rate adaptation code block in the PCS bitstream according to a rate of the PCS bitstream and a total rate of the N timeslots of the FlexE frame that are used to transmit the PCS bitstream such that the PCS bitstream in which the rate adaptation code block is inserted can be mapped to the N timeslots of the FlexE frame that are used to transmit the PCS bitstream.

Optionally, in this embodiment of the present disclosure, the FlexE overhead further includes information indicating a ratio of a rate of the CBR service data to the total rate of the N timeslots of the FlexE frame that are used to transmit the PCS bitstream.

Optionally, in this embodiment of the present disclosure, the FlexE overhead further includes information indicating a quantity of bit blocks of the CBR service data in a specific FlexE frame period and/or information indicating a quantity of bits of the CBR service data in a specific FlexE frame period.

Optionally, in this embodiment of the present disclosure, the obtaining module 510 is further configured to receive a CBR service data frame, where the data frame includes FEC overhead, perform error correction on the data frame according to the FEC overhead, and terminate the FEC overhead in the corrected data frame, to obtain the CBR service data.

Optionally, in this embodiment of the present disclosure, the rate adaptation code block is an idle code block.

Optionally, in this embodiment of the present disclosure, the FlexE overhead further includes information indicating a sequence of a PHY and/or information indicating a type of the CBR service data.

Optionally, in this embodiment of the present disclosure, the encoding module 520 is further configured to perform 64B/66B encoding, 256B/257B encoding, or 512B/513B encoding on the CBR service data to obtain the PCS bitstream.

Optionally, in this embodiment of the present disclosure, the CBR service data is OTN service data or SDH service data.

Optionally, in this embodiment of the present disclosure, the sending module 550 is further configured to split each PHY in at least one PHY, separately add AM overhead to multiple PHY branches obtained by splitting, and send the FlexE frame to a receiver using the multiple PHY branches.

Optionally, in this embodiment of the present disclosure, multiple timeslots of the FlexE frame form a master calendar layer of the FlexE, and the transmitter 500 further includes a dividing module (not shown) configured to divide the master calendar layer of the FlexE into multiple sub-calendar layers by means of polling after the adapted PCS bitstream is mapped to the N timeslots of the FlexE frame, where each sub-calendar layer forms one PHY.

It should be understood that the transmitter 500 according to this embodiment of the present disclosure may correspondingly execute the data transmission method 100 in the embodiment of the present disclosure, and the foregoing and other operations and/or functions of the modules in the transmitter 500 are respectively used to implement corresponding procedures of the methods in FIG. 3 and FIG. 10. For brevity, details are not described herein again.

Therefore, the transmitter 500 in this embodiment of the present disclosure performs PCS encoding on CBR service data, inserts a rate adaptation code block in a PCS bitstream obtained by means of encoding such that a rate of the PCS bitstream in which the rate adaptation code block is inserted is adapted to a FlexE, adds FlexE overhead including related information about the CBR service data to the PCS bitstream, and then sends the PCS bitstream. In this way, CBR service data may be mapped to a FlexE, and a carrying capability of the FlexE is improved.

Figure 14:
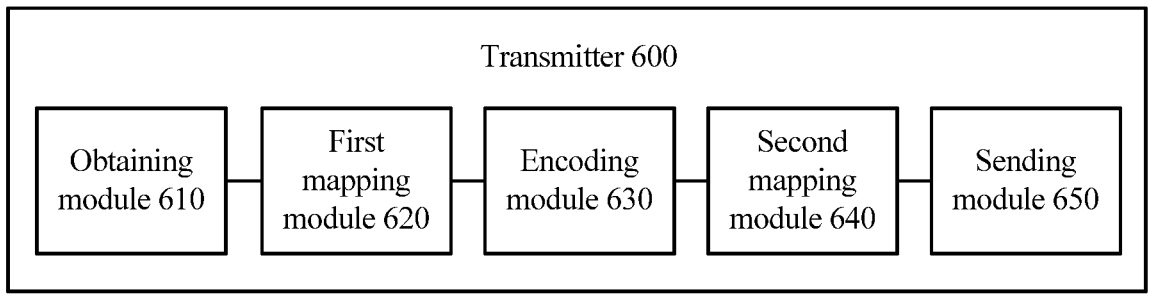
FIG. 14 is a schematic block diagram of a transmitter according to another embodiment of the present disclosure.

FIG. 14 shows a schematic block diagram of a transmitter 600 according to an embodiment of the present disclosure. The transmitter 600 corresponds to an execution body of the method 200, and the transmitter 600 includes an obtaining module 610 configured to obtain CBR service data, a first mapping module 620 configured to map the CBR service data obtained by the obtaining module 610 to an intermediate frame, where a rate of a PCS bitstream obtained by performing PCS encoding on the intermediate frame is equal to a total rate of N timeslots of a FlexE frame, an encoding module 630 configured to perform PCS encoding on the intermediate frame obtained by the first mapping module 620, a second mapping module 640 configured to map the PCS bitstream obtained by the encoding module 630 to the N timeslots of the FlexE frame, and a sending module 650 configured to send the FlexE frame, where FlexE overhead of the FlexE frame includes information used to indicate the N timeslots corresponding to the PCS bitstream.

Therefore, the transmitter 600 in this embodiment of the present disclosure maps CBR service data to an intermediate frame, adjusts a rate using the intermediate frame such that a rate of a PCS bitstream obtained by performing PCS encoding on the intermediate frame is adapted to a total rate of corresponding timeslots of a FlexE frame, and then the PCS bitstream obtained by means of encoding is distributed to a PHY, adds FlexE overhead to the PCS bitstream, and then sends the PCS bitstream. In this way, CBR service data may be mapped to a FlexE, and a carrying capability of the FlexE is improved.

Optionally, in this embodiment of the present disclosure, the first mapping module 620 is further configured to map the CBR service data to the intermediate frame using an AMP or a GMP, and add overhead of the AMP or overhead of the GMP to the intermediate frame.

Optionally, in this embodiment of the present disclosure, the FlexE overhead further includes information indicating a sequence of a PHY and/or information indicating a type of the CBR service data.

Optionally, in this embodiment of the present disclosure, the encoding module 630 is further configured to perform 64B/66B encoding, 256B/257B encoding, or 512B/513B encoding on the intermediate frame, to obtain the PCS bitstream.

Optionally, in this embodiment of the present disclosure, the CBR service data is OTN service data or SDH service data.

It should be understood that the transmitter 600 according to this embodiment of the present disclosure may correspondingly execute the data transmission method 200 in the embodiment of the present disclosure, and the foregoing and other operations and/or functions of the modules in the transmitter 600 are respectively used to implement corresponding procedures of the methods in FIG. 3 and FIG. 10. For brevity, details are not described herein again.

Therefore, the transmitter 600 in this embodiment of the present disclosure performs PCS encoding on CBR service data, inserts a rate adaptation code block in a PCS bitstream obtained by means of encoding such that a rate of the PCS bitstream in which the rate adaptation code block is inserted is adapted to a FlexE, adds FlexE overhead including related information about the CBR service data to the PCS bitstream, and then sends the PCS bitstream. In this way, CBR service data may be mapped to a FlexE, and a carrying capability of the FlexE is improved.

Figure 15:
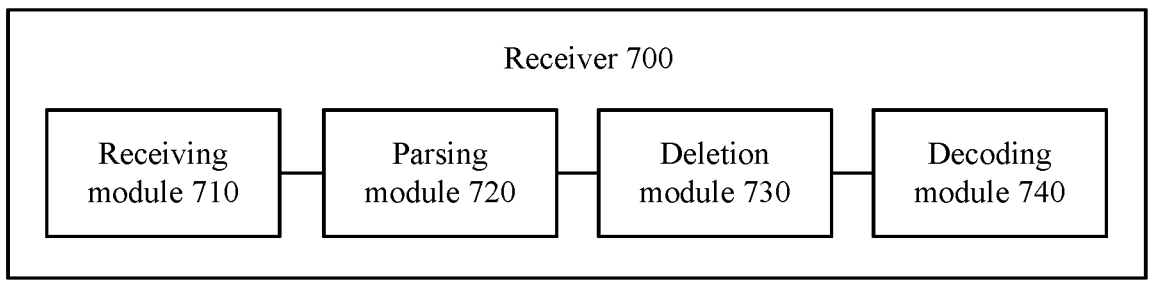
FIG. 15 is a schematic block diagram of a receiver according to an embodiment of the present disclosure.

FIG. 15 shows a schematic block diagram of a receiver 700 according to an embodiment of the present disclosure. The receiver 700 corresponds to an execution body of the method 300, and the receiver 700 includes a receiving module 710 configured to receive a FlexE frame, where the FlexE frame includes a PCS bitstream corresponding to CBR service data, and FlexE overhead of the FlexE frame includes information used to indicate N timeslots of the FlexE frame that correspond to the PCS bitstream, a parsing module 720 configured to obtain, from the N timeslots of the FlexE frame received by the receiving module 710 and by means of parsing, the PCS bitstream including a rate adaptation code block according to the information used to indicate the N timeslots of the FlexE frame that correspond to the PCS bitstream, a deletion module 730 configured to delete the rate adaptation code block in the PCS bitstream obtained by means of parsing by the parsing module 720, and a decoding module 740 configured to perform PCS decoding on the PCS bitstream that is obtained by the deletion module 730 and from which the rate adaptation code block is deleted to obtain the CBR service data.

Therefore, the receiver 700 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, obtains, from the timeslots by means of parsing, a PCS bitstream including a rate adaptation code block, deletes the rate adaptation code block in the PCS bitstream, and performs PCS decoding on the bitstream from which the rate adaptation code block is deleted to obtain the CBR service data. In this way, CBR service data may be mapped to a FlexE, and a carrying capability of the FlexE is improved.

Optionally, in this embodiment of the present disclosure, a quantity of rate adaptation code blocks included in the PCS bitstream is determined by the transmitter according to a rate of the PCS bitstream and a total rate of the N timeslots of the FlexE frame that are used to transmit the PCS bitstream.

Optionally, in this embodiment of the present disclosure, the FlexE overhead further includes information indicating a quantity of bit blocks of the CBR service data in a specific FlexE frame period and/or information indicating a quantity of bits of the CBR service data in a specific FlexE frame period.

The deletion module 730 is further configured to delete the rate adaptation code block in the PCS bitstream according to the information about a quantity of bit blocks and/or the information about a quantity of bits.

Optionally, in this embodiment of the present disclosure, the rate adaptation code block is an idle code block.

Optionally, in this embodiment of the present disclosure, the FlexE overhead further includes information indicating a sequence of a PHY and/or information indicating a type of the CBR service data.

Optionally, in this embodiment of the present disclosure, the decoding module 740 is further configured to perform 64B/66B decoding, 256B/257B decoding, or 512B/513B decoding on the PCS bitstream from which the rate adaptation code block is deleted to obtain the CBR service data.

Optionally, in this embodiment of the present disclosure, the CBR service data is OTN service data or SDH service data.

Optionally, in this embodiment of the present disclosure, the receiving module 710 is further configured to receive PHY branches from a transmitter, where each of the PHY branches includes AM overhead, and combine multiple PHY branches into at least one PHY according to the AM overhead, where the at least one PHY signal includes the FlexE frame.

It should be understood that the receiver 700 according to this embodiment of the present disclosure may correspondingly execute the data transmission method 300 in the embodiment of the present disclosure, and the foregoing and other operations and/or functions of the modules in the receiver 700 are respectively used to implement corresponding procedures of the methods in FIG. 10 and FIG. 11. For brevity, details are not described herein again.

Therefore, the receiver 700 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, obtains, from the timeslots by means of parsing, a PCS bitstream including a rate adaptation code block, deletes the rate adaptation code block in the PCS bitstream, and performs PCS decoding on the bitstream from which the rate adaptation code block is deleted to obtain the CBR service data. In this way, CBR service data may be mapped to a FlexE, and a carrying capability of the FlexE is improved.

Figure 16:
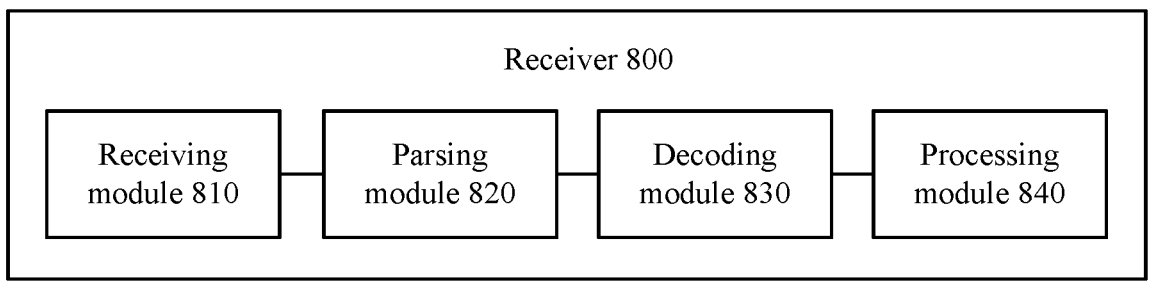
FIG. 16 is a schematic block diagram of a receiver according to another embodiment of the present disclosure.

FIG. 16 shows a schematic block diagram of a receiver 800 according to an embodiment of the present disclosure. The receiver 800 corresponds to an execution body of the method 400, and the receiver 800 includes a receiving module 810 configured to receive a FlexE frame, where the FlexE frame includes a PCS bitstream corresponding to CBR service data, and FlexE overhead of the FlexE frame includes information used to indicate N timeslots of the FlexE frame that correspond to the PCS bitstream, a parsing module 820 configured to obtain, from the N timeslots of the FlexE frame received by the receiving module 810 and by means of parsing, the PCS bitstream including a rate adaptation code block according to the information used to indicate the N timeslots of the FlexE frame that correspond to the PCS bitstream, a decoding module 830 configured to perform PCS decoding on the PCS bitstream obtained by means of parsing by the parsing module 820 to obtain an intermediate frame, and a processing module 840 configured to obtain the mapped CBR service data from the intermediate frame obtained by the decoding module 830.

Therefore, the receiver 800 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, and obtains, by means of parsing, an intermediate frame from the timeslots to obtain the CBR service data. In this way, CBR service data may be mapped to a FlexE, and a carrying capability of the FlexE is improved.

Optionally, in this embodiment of the present disclosure, the CBR service data is mapped to the intermediate frame using an AMP or a GMP, and the intermediate frame includes overhead of the AMP or overhead of the GMP.

Optionally, in this embodiment of the present disclosure, the FlexE overhead further includes information indicating a sequence of a PHY and/or information indicating a type of the CBR service data.

Optionally, in this embodiment of the present disclosure, the decoding module 830 is further configured to perform 64B/66B decoding, 256B/257B decoding, or 512B/513B decoding on the PCS bitstream to obtain the intermediate frame.

Optionally, in this embodiment of the present disclosure, the CBR service data is OTN service data or SDH service data.

Optionally, in this embodiment of the present disclosure, the receiving module 810 is further configured to receive PHY branches from a transmitter, where each of the PHY branches includes AM overhead, and combine multiple PHY branches into at least one PHY according to the AM overhead, where the at least one PHY signal includes the FlexE frame.

It should be understood that the receiver 800 according to this embodiment of the present disclosure may correspondingly execute the data transmission method 400 in the embodiment of the present disclosure, and the foregoing and other operations and/or functions of the modules in the receiver 800 are respectively used to implement corresponding procedures of the methods in FIG. 10 and FIG. 11. For brevity, details are not described herein again.

Therefore, the receiver 800 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, and obtains, by means of parsing, an intermediate frame from the timeslots to obtain the CBR service data. In this way, CBR service data may be mapped to a FlexE, and a carrying capability of the FlexE is improved.

An embodiment of the present disclosure further provides a transmitter, including a processor, a memory, and a transceiver.

The memory is configured to store an instruction, the processor is configured to execute the instruction stored by the memory in order to control the transceiver to receive and send a signal, and when the processor executes the instruction stored by the memory, the transmitter is configured to perform the method 100.

Figure 17:
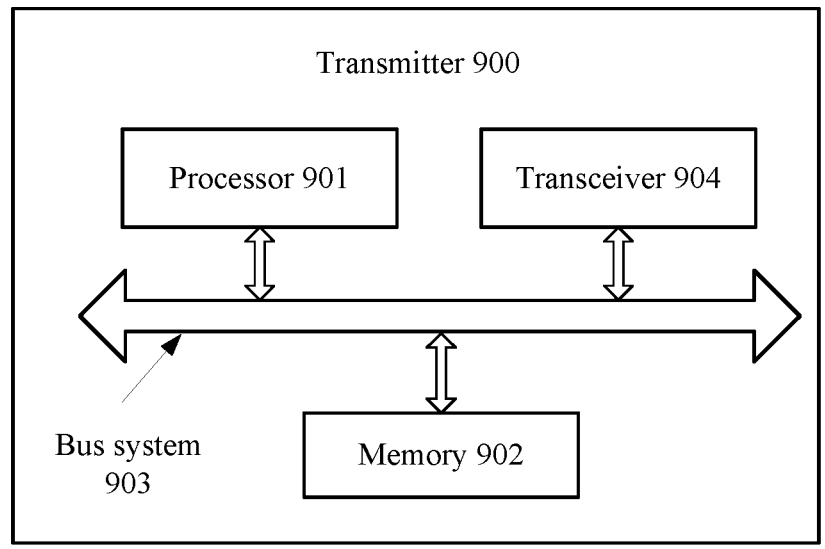
FIG. 17 is a schematic block diagram of a transmitter according to another embodiment of the present disclosure.

As shown in FIG. 17, an embodiment of the present disclosure further provides a transmitter 900. The transmitter 900 includes a processor 901, a memory 902, a bus system 903, and a transceiver 904. The processor 901, the memory 902, and the transceiver 904 are connected using the bus system 903. The memory 902 is configured to store an instruction, and the processor 901 is configured to execute the instruction stored by the memory 902. The transceiver 904 is configured to obtain CBR service data.

The processor 901 is configured to perform PCS encoding on the CBR service data, insert a rate adaptation code block in a PCS bitstream obtained by means of PCS encoding to perform rate adaptation on the PCS bitstream, and map the adapted PCS bitstream to N timeslots of a FlexE frame, where N is a positive integer greater than or equal to 1.

The transceiver 904 is further configured to send the FlexE frame, where FlexE overhead of the FlexE frame includes information used to indicate the N timeslots corresponding to the PCS bitstream.

Therefore, the transmitter 900 in this embodiment of the present disclosure performs PCS encoding on CBR service data, inserts a rate adaptation code block in a PCS bitstream obtained by means of encoding such that a rate of the PCS bitstream in which the rate adaptation code block is inserted is adapted to a FlexE, adds FlexE overhead including related information about the CBR service data to the PCS bitstream, and then sends the PCS bitstream. In this way, CBR service data may be mapped to a FlexE, and a carrying capability of the FlexE is improved.

It should be understood that, in this embodiment of the present disclosure, the processor 901 may be a Central Processing Unit (CPU), or the processor 901 may be another general purpose processor, a Digital Signal Processor (DSP), an Application Specific Integrated Circuit (ASIC), a Field-Programmable Gate Array (FPGA) or another programmable logic device, a discrete gate or a transistor logic device, a discrete hardware component, or the like. The general purpose processor may be a microprocessor or the processor 901 may be any normal processor, or the like.

The memory 902 may include a read-only memory (ROM) and a random access memory (RAM), and provides an instruction and data for the processor 901. A part of the memory 902 may further include a nonvolatile RAM (NVRAM). For example, the memory 902 may further store information about a device type.

In addition to a data bus, the bus system 903 may further include a power bus, a control bus, a status signal bus, and the like. However, for clarity, various types of buses in FIG. 17 are marked as the bus system 903.

In an implementation process, the steps in the foregoing methods may be completed by means of an integrated logic circuit of hardware in the processor 901 or an instruction in a form of software. The steps of the methods disclosed with reference to the embodiments of the present disclosure may be directly performed by a hardware processor, or may be performed using a combination of hardware in the processor 901 and a software module. The software module may be located in a mature storage medium in the field, such as a RAM, a flash memory, a ROM, a programmable ROM (PROM), an electrically-erasable PROM (EEPROM), or a register. The storage medium is located in the memory 902. The processor 901 reads information from the memory 902, and completes the steps of the foregoing methods in combination with the hardware. To avoid repetition, details are not described herein again.

Optionally, in this embodiment of the present disclosure, that the processor 901 inserts the rate adaptation code block in the PCS bitstream obtained by means of PCS encoding to perform rate adaptation on the PCS bitstream includes inserting the rate adaptation code block in the PCS bitstream according to a rate of the PCS bitstream and a total rate of the N timeslots of the FlexE frame that are used to transmit the PCS bitstream such that the PCS bitstream in which the rate adaptation code block is inserted can be mapped to the N timeslots of the FlexE frame that are used to transmit the PCS bitstream.

Optionally, in this embodiment of the present disclosure, the FlexE overhead further includes information indicating a ratio of a rate of the CBR service data to the total rate of the N timeslots of the FlexE frame that are used to transmit the PCS bitstream.

Optionally, in this embodiment of the present disclosure, that the transceiver 904 obtains the CBR service data includes receiving a CBR service data frame, where the data frame includes FEC overhead, performing error correction on the data frame according to the FEC overhead, and terminating the FEC overhead in the corrected data frame to obtain the CBR service data.

Optionally, in this embodiment of the present disclosure, the rate adaptation code block is an idle code block.

Optionally, in this embodiment of the present disclosure, the FlexE overhead further includes information indicating a sequence of a PHY and/or information indicating a type of the CBR service data.

Optionally, in this embodiment of the present disclosure, that the processor 901 performs PCS encoding on the CBR service data includes performing 64B/66B encoding, 256B/257B encoding, or 512B/513B encoding on the CBR service data to obtain the PCS bitstream.

Optionally, in this embodiment of the present disclosure, the CBR service data is OTN service data or SDH service data.

It should be understood that the transmitter 900 according to this embodiment of the present disclosure may correspondingly execute the data transmission method 100 in the embodiment of the present disclosure, and may be corresponding to the transmitter 500. The foregoing and other operations and/or functions of the modules in the transmitter 900 are respectively used to implement corresponding procedures of the methods in FIG. 3 and FIG. 10. For brevity, details are not described herein again.

Therefore, the transmitter 900 in this embodiment of the present disclosure performs PCS encoding on CBR service data, inserts a rate adaptation code block in a PCS bitstream obtained by means of encoding such that a rate of the PCS bitstream in which the rate adaptation code block is inserted is adapted to a FlexE, adds FlexE overhead including related information about the CBR service data to the PCS bitstream, and then sends the PCS bitstream. In this way, CBR service data may be mapped to a FlexE, and a carrying capability of the FlexE is improved.

An embodiment of the present disclosure further provides a transmitter, including a processor, a memory, and a transceiver.

The memory is configured to store an instruction, the processor is configured to execute the instruction stored by the memory in order to control the transceiver to receive and send a signal, and when the processor executes the instruction stored by the memory, the transmitter is configured to perform the method 200.

Figure 18:
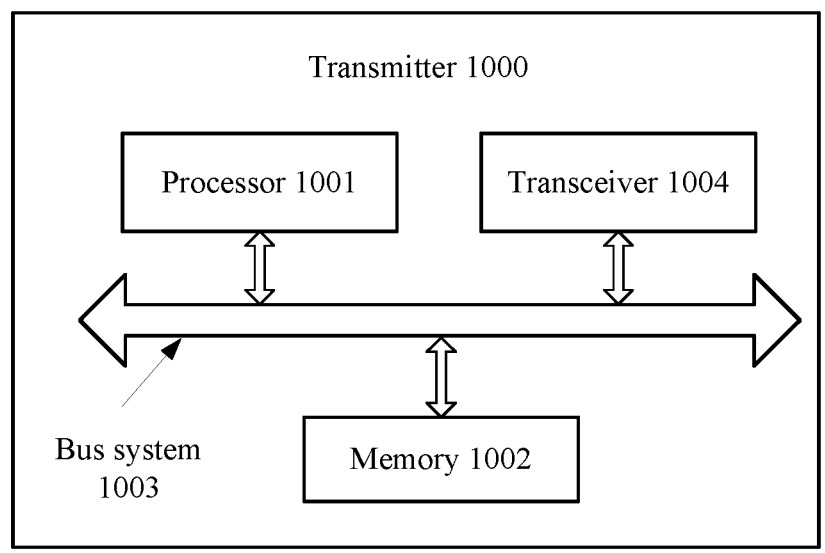
FIG. 18 is a schematic block diagram of a transmitter according to another embodiment of the present disclosure.

As shown in FIG. 18, an embodiment of the present disclosure further provides a transmitter 1000. The transmitter 1000 includes a processor 1001, a memory 1002, a bus system 1003, and a transceiver 1004. The processor 1001, the memory 1002, and the transceiver 1004 are connected using the bus system 1003. The memory 1002 is configured to store an instruction, and the processor 1001 is configured to execute the instruction stored by the memory 1002. The transceiver 1004 is configured to obtain CBR service data.

The processor 1001 is configured to map the CBR service data to an intermediate frame, where a rate of a PCS bitstream obtained by performing PCS encoding on the intermediate frame is equal to a total rate of N timeslots of a FlexE frame, perform PCS encoding on the intermediate frame, and map the PCS bitstream obtained by means of PCS encoding to the N timeslots of the FlexE frame.

The transceiver 1004 is further configured to send the FlexE frame, where FlexE overhead of the FlexE frame includes information used to indicate the N timeslots corresponding to the PCS bitstream.

Therefore, the transmitter 1000 in this embodiment of the present disclosure maps CBR service data to an intermediate frame, adjusts a rate using the intermediate frame such that a rate of a PCS bitstream obtained by performing PCS encoding on the intermediate frame is adapted to a total rate of corresponding timeslots of a FlexE, and then the PCS bitstream obtained by means of encoding is distributed to a PHY, adds FlexE overhead to the PCS bitstream, and then sends the PCS bitstream. In this way, CBR service data may be mapped to a FlexE, and a carrying capability of the FlexE is improved.

It should be understood that, in this embodiment of the present disclosure, the processor 1001 may be a CPU, or the processor 1001 may be another general purpose processor, a DSP, an ASIC, an FPGA or another programmable logic device, a discrete gate or a transistor logic device, a discrete hardware component, or the like. The general purpose processor may be a microprocessor or the processor 1001 may be any normal processor, or the like.

The memory 1002 may include a ROM and a RAM, and provides an instruction and data for the processor 1001. A part of the memory 1002 may further include an NVRAM. For example, the memory 1002 may further store information about a device type.

In addition to a data bus, the bus system 1003 may further include a power bus, a control bus, a status signal bus, and the like. However, for clarity, various types of buses in FIG. 18 are marked as the bus system 1003.

In an implementation process, the steps in the foregoing methods may be completed by means of an integrated logic circuit of hardware in the processor 1001 or an instruction in a form of software. The steps of the methods disclosed with reference to the embodiments of the present disclosure may be directly performed by a hardware processor, or may be performed using a combination of hardware in the processor 1001 and a software module. The software module may be located in a mature storage medium in the field, such as a RAM, a flash memory, a ROM, a PROM, an EEPROM, or a register. The storage medium is located in the memory 1002. The processor 1001 reads information from the memory 1002, and completes the steps of the foregoing methods in combination with the hardware. To avoid repetition, details are not described herein again.

Optionally, in this embodiment of the present disclosure, that the processor 1001 maps the CBR service data to the intermediate frame includes mapping the CBR service data to the intermediate frame using an AMP or a GMP, and adding overhead of the AMP or overhead of the GMP to the intermediate frame.

Optionally, in this embodiment of the present disclosure, the FlexE overhead further includes information indicating a sequence of a PHY and/or information indicating a type of the CBR service data.

Optionally, in this embodiment of the present disclosure, that the processor 1001 performs PCS encoding on the intermediate frame includes performing 64B/66B encoding, 256B/257B encoding, or 512B/513B encoding on the intermediate frame, to obtain the PCS bitstream.

Optionally, in this embodiment of the present disclosure, the CBR service data is OTN service data or SDH service data.

It should be understood that the transmitter 1000 according to this embodiment of the present disclosure may correspondingly execute the data transmission method 200 in the embodiment of the present disclosure, and may be corresponding to the transmitter 600. The foregoing and other operations and/or functions of the modules in the transmitter 1000 are respectively used to implement corresponding procedures of the methods in FIG. 3 and FIG. 10. For brevity, details are not described herein again.

Therefore, the transmitter 1000 in this embodiment of the present disclosure maps CBR service data to an intermediate frame, adjusts a rate using the intermediate frame such that a rate of a PCS bitstream obtained by performing PCS encoding on the intermediate frame is adapted to a total rate of corresponding timeslots of a FlexE, and then the PCS bitstream obtained by means of encoding is distributed to a PHY, adds FlexE overhead to the PCS bitstream, and then sends the PCS bitstream. In this way, CBR service data may be mapped to a FlexE, and a carrying capability of the FlexE is improved.

An embodiment of the present disclosure further provides a receiver, including a processor, a memory, and a transceiver.

The memory is configured to store an instruction, the processor is configured to execute the instruction stored by the memory in order to control the transceiver to receive and send a signal, and when the processor executes the instruction stored by the memory, the transmitter is configured to perform the method 300.

Figure 19:
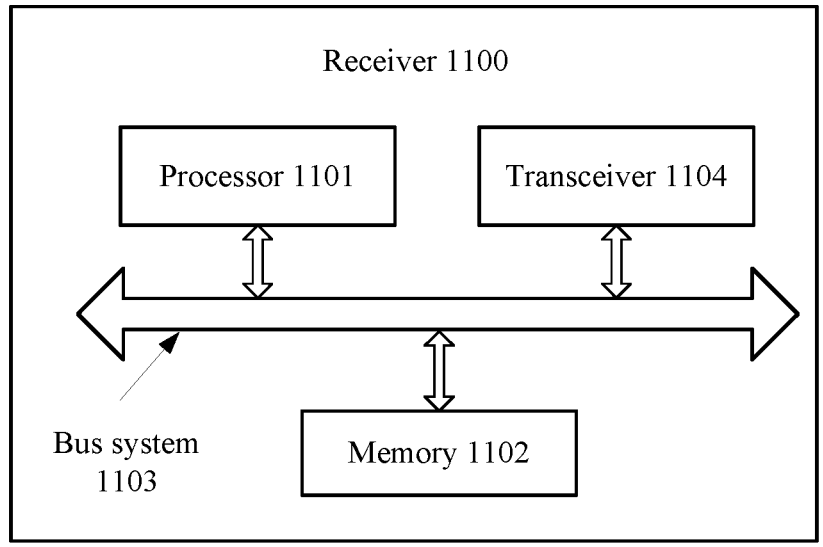
FIG. 19 is a schematic block diagram of a receiver according to another embodiment of the present disclosure.

As shown in FIG. 19, an embodiment of the present disclosure further provides a receiver 1100. The receiver 1100 ncludes a processor 1101, a memory 1102, a bus system 1103, and a transceiver 1104. The processor 1101, the memory 1102, and the transceiver 1104 are connected using the bus system 1103. The memory 1102 is configured to store an instruction, and the processor 1101 is configured to execute the instruction stored by the memory 1102. The transceiver 1104 is configured to receive a FlexE frame, where the FlexE frame includes a PCS bitstream corresponding to CBR service data, and FlexE overhead of the FlexE frame includes information used to indicate N timeslots of the FlexE frame that correspond to the PCS bitstream.

The processor 1101 is configured to obtain, from the N timeslots of the FlexE frame by means of parsing, the PCS bitstream including a rate adaptation code block according to the information used to indicate the N timeslots of the FlexE frame that correspond to the PCS bitstream, delete the rate adaptation code block in the PCS bitstream, and perform PCS decoding on the PCS bitstream from which the rate adaptation code block is deleted to obtain the CBR service data.

Therefore, the receiver 1100 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, obtains, from the timeslots by means of parsing, a PCS bitstream including a rate adaptation code block, deletes the rate adaptation code block in the PCS bitstream, and performs PCS decoding on the bitstream from which the rate adaptation code block is deleted to obtain the CBR service data. In this way, CBR service data may be mapped to a FlexE, and a carrying capability of the FlexE is improved.

It should be understood that, in this embodiment of the present disclosure, the processor 1101 may be a CPU, or the processor 1101 may be another general purpose processor, a DSP, an ASIC, an FPGA or another programmable logic device, a discrete gate or a transistor logic device, a discrete hardware component, or the like. The general purpose processor may be a microprocessor or the processor 1101 may be any normal processor, or the like.

The memory 1102 may include a ROM and a RAM, and provides an instruction and data for the processor 1101. A part of the memory 1102 may further include an NVRAM. For example, the memory 1102 may further store information about a device type.

In addition to a data bus, the bus system 1103 may further include a power bus, a control bus, a status signal bus, and the like. However, for clarity, various types of buses in FIG. 19 are marked as the bus system 1103.

In an implementation process, the steps in the foregoing methods may be completed by means of an integrated logic circuit of hardware in the processor 1101 or an instruction in a form of software. The steps of the methods disclosed with reference to the embodiments of the present disclosure may be directly performed by a hardware processor, or may be performed using a combination of hardware in the processor 1101 and a software module. The software module may be located in a mature storage medium in the field, such as a RAM, a flash memory, a ROM, a PROM, an EEPROM, or a register. The storage medium is located in the memory 1102. The processor 1101 reads information from the memory 1102, and completes the steps of the foregoing methods in combination with the hardware. To avoid repetition, details are not described herein again.

Optionally, in this embodiment of the present disclosure, a quantity of rate adaptation code blocks included in the PCS bitstream is determined by the transmitter according to a rate of the PCS bitstream and a total rate of the N timeslots of the FlexE frame that are used to transmit the PCS bitstream.

Optionally, in this embodiment of the present disclosure, the FlexE overhead further includes information indicating a quantity of bit blocks of the CBR service data in a specific FlexE frame period and/or information indicating a quantity of bits of the CBR service data in a specific FlexE frame period.

That the processor 1101 deletes the rate adaptation code block in the PCS bitstream includes deleting the rate adaptation code block in the PCS bitstream according to the information about a quantity of bit blocks and/or the information about a quantity of bits.

Optionally, in this embodiment of the present disclosure, the rate adaptation code block is an idle code block.

Optionally, in this embodiment of the present disclosure, the FlexE overhead further includes information indicating a sequence of a PHY and/or information indicating a type of the CBR service data.

Optionally, in this embodiment of the present disclosure, that the processor 1101 performs PCS decoding on the PCS bitstream from which the rate adaptation code block is deleted to obtain the CBR service data includes performing 64B/66B decoding, 256B/257B decoding, or 512B/513B decoding on the PCS bitstream from which the rate adaptation code block is deleted to obtain the CBR service data.

Optionally, in this embodiment of the present disclosure, the CBR service data is OTN service data or SDH service data.

It should be understood that the receiver 1100 according to this embodiment of the present disclosure may correspondingly execute the data transmission method 300 in the embodiment of the present disclosure, and may be corresponding to the receiver 700. The foregoing and other operations and/or functions of the modules in the receiver 1100 are respectively used to implement corresponding procedures of the methods in FIG. 10 and FIG. 11. For brevity, details are not described herein again.

Therefore, the receiver 1100 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, obtains, from the timeslots by means of parsing, a PCS bitstream including a rate adaptation code block, deletes the rate adaptation code block in the PCS bitstream, and performs PCS decoding on the bitstream from which the rate adaptation code block is deleted, to obtain the CBR service data. In this way, CBR service data may be mapped to a FlexE, and a carrying capability of the FlexE is improved.

An embodiment of the present disclosure further provides a receiver, including a processor, a memory, and a transceiver.

The memory is configured to store an instruction, the processor is configured to execute the instruction stored by the memory in order to control the transceiver to receive and send a signal, and when the processor executes the instruction stored by the memory, the transmitter is configured to perform the method 400.

Figure 20:
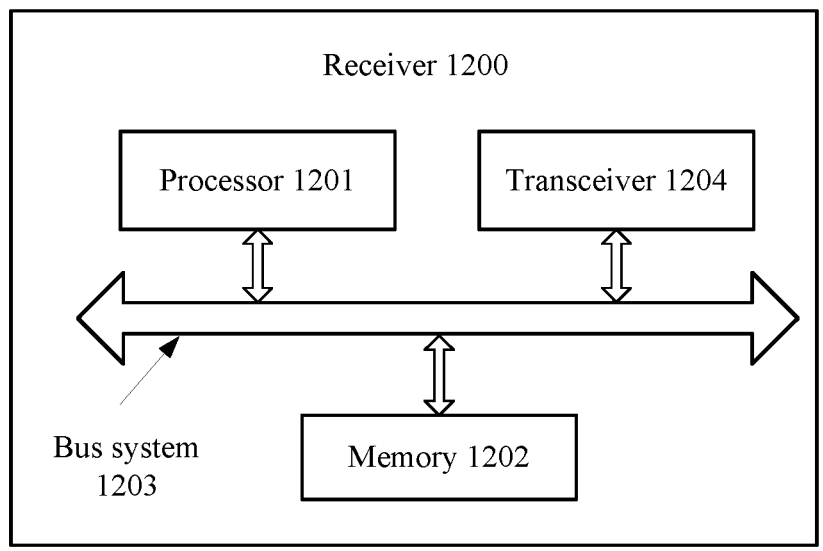
FIG. 20 is a schematic block diagram of a receiver according to another embodiment of the present disclosure.

As shown in FIG. 20, an embodiment of the present disclosure further provides a receiver 1200. The receiver 1200 includes a processor 1201, a memory 1202, a bus system 1203, and a transceiver 1204. The processor 1201, the memory 1202, and the transceiver 1204 are connected using the bus system 1203. The memory 1202 is configured to store an instruction, and the processor 1201 is configured to execute the instruction stored by the memory 1202. The transceiver 1204 is configured to receive a FlexE frame, where the FlexE frame includes a PCS bitstream corresponding to CBR service data, and FlexE overhead of the FlexE frame includes information used to indicate N timeslots of the FlexE frame that correspond to the PCS bitstream.

The processor 1201 is configured to obtain, from the N timeslots of the FlexE frame by means of parsing, the PCS bitstream including a rate adaptation code block according to the information used to indicate the N timeslots of the FlexE frame that correspond to the PCS bitstream, perform PCS decoding on the PCS bitstream, to obtain an intermediate frame, and obtain the mapped CBR service data from the intermediate frame.

Therefore, the receiver 1200 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, and obtains, by means of parsing, an intermediate frame from the timeslots, to obtain the CBR service data. In this way, CBR service data may be mapped to a FlexE, and a carrying capability of the FlexE is improved.

It should be understood that, in this embodiment of the present disclosure, the processor 1201 may be a CPU, or the processor 1201 may be another general purpose processor, a DSP, an ASIC, an FPGA or another programmable logic device, a discrete gate or a transistor logic device, a discrete hardware component, or the like. The general purpose processor may be a microprocessor or the processor may be any normal processor, or the like.

The memory 1202 may include a ROM and a RAM, and provides an instruction and data for the processor 1201. A part of the memory 1202 may further include an NVRAM. For example, the memory 1202 may further store information about a device type.

In addition to a data bus, the bus system 1203 may further include a power bus, a control bus, a status signal bus, and the like. However, for clarity, various types of buses in the figure are marked as the bus system 1203.

In an implementation process, the steps in the foregoing methods may be completed by means of an integrated logic circuit of hardware in the processor 1201 or an instruction in a form of software. The steps of the methods disclosed with reference to the embodiments of the present disclosure may be directly performed by a hardware processor, or may be performed using a combination of hardware in the processor 1201 and a software module. The software module may be located in a mature storage medium in the field, such as a RAM, a flash memory, a ROM, a PROM, an EEPROM, or a register. The storage medium is located in the memory 1202. The processor 1201 reads information from the memory 1202, and completes the steps of the foregoing methods in combination with the hardware. To avoid repetition, details are not described herein again.

Optionally, in this embodiment of the present disclosure, the CBR service data is mapped to the intermediate frame using an AMP or a GMP, and the intermediate frame includes overhead of the AMP or overhead of the GMP.

It should be understood that the receiver 1200 according to this embodiment of the present disclosure may correspondingly execute the data transmission method 400 in the embodiment of the present disclosure, and may be corresponding to the receiver 800. The foregoing and other operations and/or functions of the modules in the receiver 1200 are respectively used to implement corresponding procedures of the methods in FIG. 10 and FIG. 11. For brevity, details are not described herein again.

Therefore, the receiver 1200 in this embodiment of the present disclosure receives a FlexE frame, determines, according to information that is included in FlexE overhead and that indicates a correspondence between a PCS bitstream and a timeslot, timeslots of the FlexE frame that correspond to CBR service data, and obtains, by means of parsing, an intermediate frame from the timeslots, to obtain the CBR service data. In this way, CBR service data may be mapped to a FlexE, and a carrying capability of the FlexE is improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A data transmission method, comprising:
   obtaining constant bit rate (CBR) service data;
   performing encoding on the CBR service data to obtain a bitstream;
   performing rate adaptation on the bitstream by inserting a rate adaptation code block in the bitstream to obtain a rate adapted bitstream;
   mapping the rate adapted bitstream to N timeslots of a flexible Ethernet data frame, wherein N is a positive integer greater than one; and
   sending the flexible Ethernet data frame, wherein an overhead of the flexible Ethernet data frame comprises information indicating the N timeslots corresponding to the rate adapted bitstream.

2. The method according to claim 1, wherein performing encoding on the CBR service data comprises using an encoding scheme comprising 64B/66B, 256B/257B, or 512B/513B.

3. The method according to claim 1, wherein performing encoding on the CBR service data comprises:
   mapping the CBR service data into to an intermediate frame; and
   performing encoding on the intermediate frame such that a rate of the intermediate frame is adapted to a total rate of the N time slots of the flexible Ethernet data frame.

4. The method according to claim 1, further comprising:
   using an asynchronous mapping procedure (AMP) or a generic mapping procedure (GMP) to map the CBR service data to an intermediate flame; and
   adding AMP overhead or GMP overhead into the intermediate frame.

5. The method according to claim 1, wherein obtaining the CBR service data comprises:
   receiving a CBR service data frame, wherein the CBR service data frame comprises forward error correction (FEC) overhead;
   performing error correction on the CBR service data frame according to the FEC overhead; and
   terminating the FEC overhead in the corrected CBR service data frame to obtain the CBR service data.

6. The method according to claim 1, wherein the rate adaptation code block comprises an idle code block.

7. The method according to claim 1, wherein the overhead further comprises information indicating a sequence of a physical layer (PHY) device or information indicating a type of the CBR service data.

8. The method according to claim 3, wherein the CBR service data comprises optical transport network (OTN) service data or synchronous digital hierarchy (SDH) service data, and wherein the intermediate frame comprises a time division multiplexing (TDM) structure.

9. The method according to claim 1, wherein the flexible Ethernet data frame comprises a physical coding sublayer (PCS) bitstream corresponding to the CBR service data.

10. The method according to claim 1, wherein inserting the rate adaptation code block comprises inserting the rate adaptation code block in the bitstream according to a rate of the bitstream and a total rate of the N timeslots of the flexible Ethernet data frame transmitting the rate adapted bitstream.

11. The method according to claim 1, wherein the overhead further comprises information indicating a quantity of bit blocks of the CBR service data in a specific data frame period or information indicating a quantity of bits of the CBR service data in the specific data frame period.

12. A device, comprising:
  a memory configured to store instructions; and
  a processor coupled to the memory and configured to execute the instructions to cause the device to:
    obtain constant bit rate (CBR) service data;
    perform encoding on the CBR service data, to obtain a bitstream;
    perform rate adaptation on the bitstream by inserting a rate adaptation code block in the bitstream to obtain a rate adapted bitstream;
    map the rate adapted bitstream to N timeslots of a flexible Ethernet data frame, wherein N is a positive integer greater than one; and
    send the flexible Ethernet data frame, wherein an overhead of the flexible Ethernet data frame comprises information indicating the N timeslots corresponding to the rate adapted bitstream.

13. The device according to claim 12, wherein the device performs encoding on the CBR service data using an encoding scheme comprising 64B/66B, 256B/257B, or 512B/513B.

14. The device according to claim 13, wherein the device further performs encoding on the CBR service data by:
  mapping the CBR service data into an intermediate frame; and
  performing encoding on the intermediate frame.

15. The device according to claim 14, wherein mapping the CBR service data into the intermediate frame comprises:
  using asynchronous mapping procedure (AMP) or generic mapping procedure (GMP);
  mapping the CBR service data into the intermediate frame; and
  adding AMP overhead or GMP overhead into the intermediate frame.

16. The device according to claim 12, wherein obtaining the CBR service data further comprises:
  receiving a CBR service data frame, wherein the CBR service data frame further comprises forward error correction (FEC) overhead;
  performing error correction on the CBR service data frame according to the FEC overhead; and
  terminating the FEC overhead in the corrected CBR service data frame to obtain the CBR service data.

17. The device according to claim 12, wherein the flexible Ethernet data frame comprises a physical coding sublayer (PCS) bitstream corresponding to the CBR service data.

18. The device according to claim 12, wherein inserting the rate adaptation code block further comprises inserting the rate adaptation code block in the bitstream such that a rate of the bitstream in which the rate adaptation code block is inserted is adapted to a total rate of the N timeslots of the flexible Ethernet data frame transmitting the rate adapted bitstream.

19. The device according to claim 12, wherein the overhead further comprises information indicating a quantity of bit blocks of the CBR service data in a specific data frame period or information indicating a quantity of bits of the CBR service data in the specific data frame period.

20. A communication system, comprising:
  a sending device comprising a first memory and a first processor configured to execute first instructions stored on the first memory to cause the sending device to:
    obtain constant bit rate (CBR) service data;
    perform encoding on the CBR service data, to obtain a bitstream;
    perform rate adaptation on the bitstream by inserting a rate adaptation code block in the bitstream to obtain a rate adapted bitstream;
    map the rate adapted bitstream to N timeslots of a data frame, wherein N is a positive integer greater than one; and
    send the data frame, wherein an overhead of the data frame comprises information indicating the N timeslots corresponding to the rate adapted bitstream; and
  a receiving device comprising a second memory and a second processor configured to execute second instructions stored on the second memory to cause the receiving device to:
    receive the data frame;
    obtain, from the N timeslots of the data frame by parsing, the rate adapted bitstream comprising the rate adaptation code block;
    delete the rate adaptation code block in the rate adapted bitstream to obtain the bitstream; and
    decode the bitstream to obtain the CBR service data.

* * * * *

UNITED STATES PATENT AND TRADEMARK OFFICE
CERTIFICATE OF CORRECTION

| | | |
|---|---|---|
| PATENT NO. | : 11,252,098 B2 | Page 1 of 1 |
| APPLICATION NO. | : 16/749646 | |
| DATED | : February 15, 2022 | |
| INVENTOR(S) | : Qiuyou Wu and Qiwen Zhong | |

It is certified that error appears in the above-identified patent and that said Letters Patent is hereby corrected as shown below:

On the Title Page

Item (54) and in the Specification, Column 1, Lines 1-2, Title: "Data Transmission Method, Transmitter, and Receiver" should read "CRB Data Transmission Method, Transmitter, and Receiver"

Signed and Sealed this
Twenty-sixth Day of April, 2022

Katherine Kelly Vidal
*Director of the United States Patent and Trademark Office*